United States Patent
Shim et al.

(10) Patent No.: US 9,772,136 B2
(45) Date of Patent: Sep. 26, 2017

(54) REFRIGERATOR, AND APPARATUS AND METHOD FOR REFRIGERATOR DIAGNOSIS

(75) Inventors: Jai Hwan Shim, Changwon-si (KR); Jin Hoon Jung, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 933 days.

(21) Appl. No.: 13/884,425

(22) PCT Filed: Mar. 12, 2012

(86) PCT No.: PCT/KR2012/001780
§ 371 (c)(1),
(2), (4) Date: Nov. 15, 2013

(87) PCT Pub. No.: WO2012/124953
PCT Pub. Date: Sep. 20, 2012

(65) Prior Publication Data
US 2014/0070951 A1  Mar. 13, 2014

(30) Foreign Application Priority Data
Mar. 15, 2011  (KR) .................. 10-2011-0022928

(51) Int. Cl.
*F25D 27/00* (2006.01)
*F25D 29/00* (2006.01)
(Continued)

(52) U.S. Cl.
CPC .......... *F25D 29/008* (2013.01); *F25B 49/005* (2013.01); *F25D 29/00* (2013.01); *H04L 12/2823* (2013.01); *H04L 2012/285* (2013.01)

(58) Field of Classification Search
CPC . F25D 29/008; F25B 49/005; H04L 2012/285
(Continued)

(56) References Cited

U.S. PATENT DOCUMENTS

2002/0029575 A1* 3/2002 Okamoto ................ F25B 49/00
62/125
2005/0011205 A1* 1/2005 Holmes ................... F25D 29/00
62/156
(Continued)

FOREIGN PATENT DOCUMENTS

| JP | 2004-69246 A | 3/2004 |
| JP | 2005-69540 A | 3/2005 |

(Continued)

*Primary Examiner* — Qutbuddin Ghulamali
(74) *Attorney, Agent, or Firm* — Birch, Stewart, Kolasch & Birch, LLP

(57) ABSTRACT

The present invention relates to a refrigerator and to an apparatus and method for refrigerator diagnosis. More particularly, the refrigerator converts product information and outputs a tone when a command for storing data and performing a diagnosis is inputted during operation. The refrigerator diagnosis apparatus receives the tone and diagnoses the state of or presence of defects in the refrigerator based on the data contained in the product information so as to analyze the cause of the defect and propose countermeasures to repair the refrigerator. Thus, the diagnosis of defects may be accurately and easily performed upon the occurrence of defect in the refrigerator.

16 Claims, 27 Drawing Sheets

(51) Int. Cl.
*F25B 49/00* (2006.01)
*H04L 12/28* (2006.01)

(58) Field of Classification Search
USPC .......................................... 340/585, 5.1, 586
See application file for complete search history.

(56) References Cited

U.S. PATENT DOCUMENTS

2009/0323913 A1   12/2009  Lee et al.
2011/0032072 A1*  2/2011   Han .................... H04L 12/2827
                                                        340/5.1

FOREIGN PATENT DOCUMENTS

| JP | 2006-234214 A | 9/2006 |
| KR | 1996-0001985 B1 | 2/1996 |
| KR | 10-0165027 B1 | 1/1999 |
| KR | 10-2007-0030075 A | 3/2007 |

\* cited by examiner

Fig. 10

| Name | value |
|---|---|
| Time information: within 12 hours/12 hours elapse/24 hours elapse | 3.0 |
| Count of freezing compartment door open for the latest two days | 0.0 |
| Accumulated time of freezing compartment door open for the latest two days(min) | 0.0 |
| Average temperature of freezing compartment sensor for the latest two days(°C) | −15.5 |
| Maximum temperature of freezing compartment sensor for the latest two days(°C) | 3.0 |
| Minimum temperature of freezing compartment sensor for the latest two days(°C) | −20.5 |
| operation time of freezing compartment fan for the latest two days(min) | 2192.0 |
| Count of refrigerating compartment door open for the latest two days | 1.0 |
| Accumulated time of refrigerating compartment door open for the latest two days(min) | 0.0 |
| Average temperature of refrigerating compartment sensor for the latest two days(°C) | 6.5 |
| Maximum temperature of refrigerating compartment sensor for the latest two days(°C) | 12.0 |
| Minimum temperature of refrigerating compartment sensor for the latest two days(°C) | 3.0 |
| operation time of refrigerating compartment fan(min) | 751.0 |
| average temperature of external air temperature sensor for the latest two days(°C) | 24.0 |
| maximum temperature of external air temperature sensor for the latest two days(°C) | 28.5 |
| minimum temperature of external air temperature sensor for the latest two days(°C) | 18.5 |
| average temperature of freezing compartment defrosting sensor for the latest two days(°C) | −28.0 |
| maximum temperature of freezing compartment defrosting sensor for the latest two days(°C) | −7.0 |
| minimum temperature of freezing compartment defrosting sensor for the latest two days(°C) | −33.5 |
| average temperature of refrigerating compartment defrosting sensor for the latest two days(°C) | −3.5 |
| maximum temperature of refrigerating compartment defrosting sensor for the latest two days(°C) | 4.5 |
| minimum temperature of refrigerating compartment defrosting sensor for the latest two days(°C) | −15.5 |
| latest F defrosting time(min) | 80.0 |
| latest R defrosting time(min) | 80.0 |
| latest F defrosting period(hour) | 59.0 |
| operation time of compressor for the latest two days(min) | 2849.0 |
| Celsius/Fahrenheit | 1.0 |

(a)

(b)

| Step | range | state | Pulse(±5%) | remark |
|---|---|---|---|---|
| 1Step | 1.0 kg/cm² Or less | Low water pressure | 55.7 Or less | 55.7 Or less |
| 2Step | 1.0~1.4 kg/cm² | | 55.8~75.4 | 55.8~71.6 |
| 3Step | 1.5~3.0 kg/cm² | Normal | 75.5~130.2 | 71.7~130.2 |
| 4Step | 3.1~5.0 kg/cm² | | 130.3~178.9 | 130.3~178.9 |
| 5Step | 5.0~8.4 kg/cm² | | 179.0~254.0 | 179.0~266.7 |
| 6Step | 8.5~10.0 kg/cm² | High water pressure | 254.1~280.4 | 266.7~280.4 |
| 7Step | 10.0 kg/cm² Or more | | 280.5 Or more | 280.5 Or more |

REFRIGERATOR, AND APPARATUS AND METHOD FOR REFRIGERATOR DIAGNOSIS

TECHNICAL FIELD

The present invention concerns a refrigerator, a refrigerator diagnosing apparatus and method, and more specifically, to a refrigerator and a refrigerator diagnosing apparatus and method that convert product information into a signal sound, outputs the signal sound, and diagnoses the refrigerator based on the product information.

BACKGROUND ART

A user's typical response to a malfunctioning refrigerator is attempting to fix it on his own based on a measure provided from a service center or to ask the service center to dispatch a service person to handle the problem.

In such a way, however, the user cannot correctly let them know the erroneous symptoms of the refrigerator nor does the service center properly address the issue as well.

Recently, a way is being contemplated for the user to transfer the erroneous symptoms of the refrigerator to the service center, in which the symptoms of the refrigerator are converted into a signal sound that is then output and transferred to the service center through a phone. However, the signal sound transferred that way contains only information on the current state of the refrigerator but fails to convey information on the history of operations performed thus far. In particular, the refrigerator stays in operation all the time since power on, and in many case, cause of current errors is closely associated with the state in which the refrigerator has been recently operating. Thus, the conventional way of outputting only the information as to the current state as a signal sound cannot precisely diagnose the refrigerator.

DISCLOSURE

Technical Problem

An object of the present invention is to provide a refrigerator and a refrigerator diagnosing apparatus and method that accumulates information on an operation history during a predetermined time period while the refrigerator is in operation, converts product information including the accumulated information into a signal sound, and outputs the signal sound.

Further, an object of the present invention is to provide a refrigerator and a refrigerator diagnosing apparatus and method, in which while the refrigerator is in operation, information on an operation history is accumulated during a predetermined time period and product information is converted into a signal sound that is then output, the diagnosing apparatus receives the product information and diagnoses the refrigerator to produce a response in accordance with a cause of a failure, thereby responding to the failure.

Technical Solution

The present invention is characterized by a refrigerator comprising a memory storing various types of information that are generated according to an operation state of the refrigerator; a selecting unit receiving a diagnosis execution command; a controller accumulatively storing the various types of information generated according to the operation state of the refrigerator in the memory for a predetermined time period and when the diagnosis execution command is entered through the selecting unit generating operation information based on the information stored in the memory; and a sound output unit outputting a signal sound according to product information including the operation information, wherein the controller updates the information stored in the memory at a predetermined period interval, deletes information stored during a first one period section among information stored in the memory until right before the information is updated, updates the memory when as long a period as a predetermined number of times is passed after power is on, and when the diagnosis execution command is entered through the selecting unit before the memory is first updated, generates operation information based on the information stored in the memory until before diagnosis is performed after the power is on.

Further, the present invention is characterized by a refrigerator comprising a memory storing various types of information that are generated according to an operation state of the refrigerator; a selecting unit receiving a diagnosis execution command; a controller accumulatively storing the various types of information generated according to the operation state of the refrigerator in the memory for a predetermined time period and when the diagnosis execution command is entered through the selecting unit generating operation information based on the information stored in the memory; and a sound output unit outputting a signal sound according to product information including the operation information, wherein the controller deletes the information stored in the memory when a predetermined reset set time is passed after the diagnosis execution command is entered through the selecting unit and a signal sound is output through the sound output unit and performs control so that the sound output unit outputs a signal sound according to product information including operation information generated when previous diagnosis is performed when the diagnosis execution command is re-entered through the selecting unit before the reset set period is passed after the diagnosis execution command is entered through the selecting unit and the signal sound is output through the sound output unit.

Advantageous Effects

In the refrigerator and the refrigerator diagnosing apparatus and method according to the present invention, product information is configured including operation information accumulated during a predetermined time period before diagnosis is conducted, and a signal sound is output in accordance with the product information. Accordingly, the operation state of the refrigerator may be figured out through the signal sound until diagnosis is performed, thus enabling erroneous symptoms of the refrigerator to be more correctly diagnosed.

Further, the signal sound output from the refrigerator according to the present invention may deliver information on the pattern in which the refrigerator has been used till recently since diagnosis has been conducted, and thereby, it may be figured out exact cause, such as whether current erroneous symptoms originate from failure of parts, a user's poor manipulation, a user's improper usage patterns or special ambient environments where the refrigerator is installed.

Still further, measurements may be provided which allow for analysis, diagnosis, and repair on causes of at least one of water leakage from the refrigerator, errors coming from the state of a dispenser or ice-making state of the refrigerator or errors occurring as ice is taken out, and temperature control errors, and defrosting operation problems. Thus, a user may easily determine the condition of the refrigerator, and a service person may readily provide a customer service on the refrigerator. Therefore, service system efficiency and users' satisfaction may go up.

DESCRIPTION OF DRAWINGS

FIG. 10 specifically enumerates operation information displayed on the operation information displaying area of FIG. 9.

BEST MODE

Figure 1:
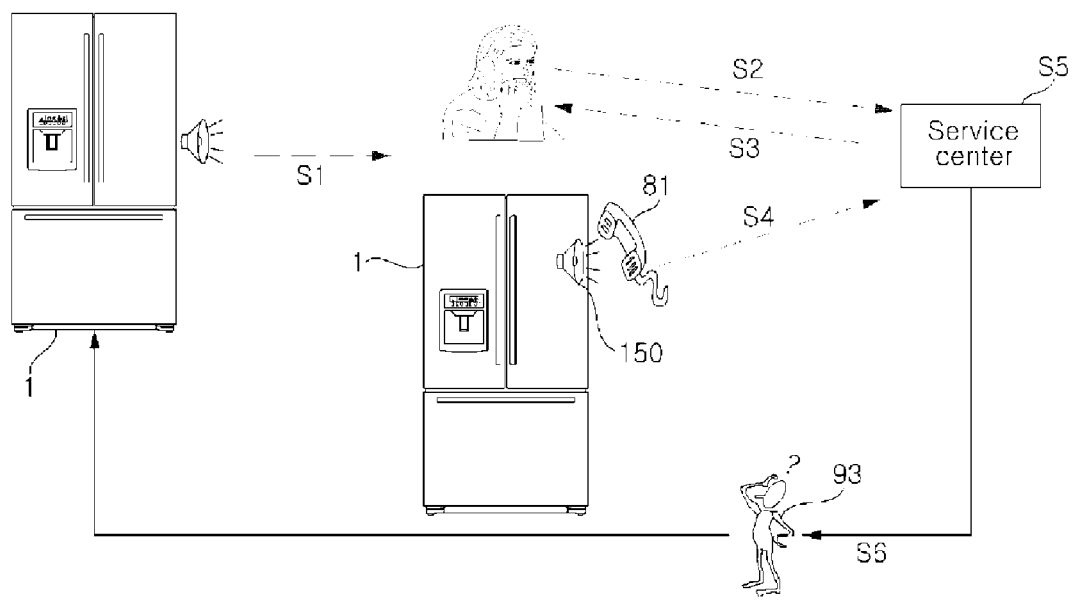
FIG. 1 shows a refrigerator and a diagnosing system including the refrigerator according to an embodiment of the present invention.

Advantages and features of the present invention and methods of achieving the same will be apparent by referring to the embodiments described below in detail with reference to the accompanying drawings. However, the present invention is not limited to the embodiments described below and various modifications may be made thereto. The embodiments are merely provided to thoroughly disclose the invention and to convey the category of the invention to one of ordinary skill in the art. The present invention is defined by the appended claims. The same reference numerals denote the same elements throughout the specification.

FIG. 1 shows a refrigerator and a diagnosing system including the refrigerator according to an embodiment of the present invention. Referring to FIG. 1, the diagnosing system according to an embodiment of the present invention includes a refrigerator 1 converting product information into a signal sound and outputting the signal sound and a diagnosing apparatus (200, refer to FIG. 8) receiving the signal sound output from the refrigerator 1 through a communication network, inversely extracting the product information from the received signal sound, and diagnosing the refrigerator 1 based on the product information.

In case the refrigerator 1 causes a failure or the refrigerator 1 cannot normally operate due to an environmental cause of a place where the refrigerator 1 is installed or a user's poor manipulation, a predetermined alert sound is output from the refrigerator 1 (S1). A user recognizes the alert sound and takes proper steps. If necessary, the user contacts a service center to inquire about measurements (S2). The user explains erroneous symptoms of the refrigerator 1 to an operator of the service center, and the operator advises corresponding measurements to the user (S3). The user may attempt to take some steps by manipulating the refrigerator 1 as advised by the operator. However, in some cases, the operator's tips may not be enough to address the erroneous symptoms. This may occur when the user failed to provide correct explanation on the condition of the refrigerator 1 to the operator or the erroneous symptoms explained by the user are insufficient to come into correct conclusion about the cause of malfunctions of the refrigerator 1.

The user brings a phone close to a sound output unit 150 as guided by the operator and manipulates the refrigerator 1 so that the refrigerator 1 performs a diagnosis mode. The refrigerator 1 may include a selecting unit that enables users to select start of the diagnosis mode. The selecting unit may include buttons, dials, tact switches, and a touch pad.

When entering into the diagnosis mode by the user selecting the selecting unit, the refrigerator 1 converts product information into a predetermined signal sound and outputs the signal sound. The signal sound is output through the sound output unit 150 as described above and is transmitted to the service center through a communication network connected to the phone.

The service center may be provided with a diagnosing apparatus (200, refer to FIG. 15) that is connected to the communication network and receives the signal sound output from the sound output unit 150 (S4) and analyzes the received signal sound and performs diagnosis on a home appliance. The diagnosing apparatus 200 inversely extracts the product information from the signal sound received through the communication network and analyzes the product information, thereby diagnosing the refrigerator 1.

Meanwhile, a result of the diagnosis may be notified to a repair person (S6) who is to be dispatched to the user's house for repairing the refrigerator 1 (S6). The repair person S6 visits the user after checking the diagnosis result notified through, e.g., a terminal and preparing for parts necessary for repair. Since necessary parts may be correctly ready in advance, the repair person 93 may revisit the user at a significantly reduced number of times.

Figure 2:
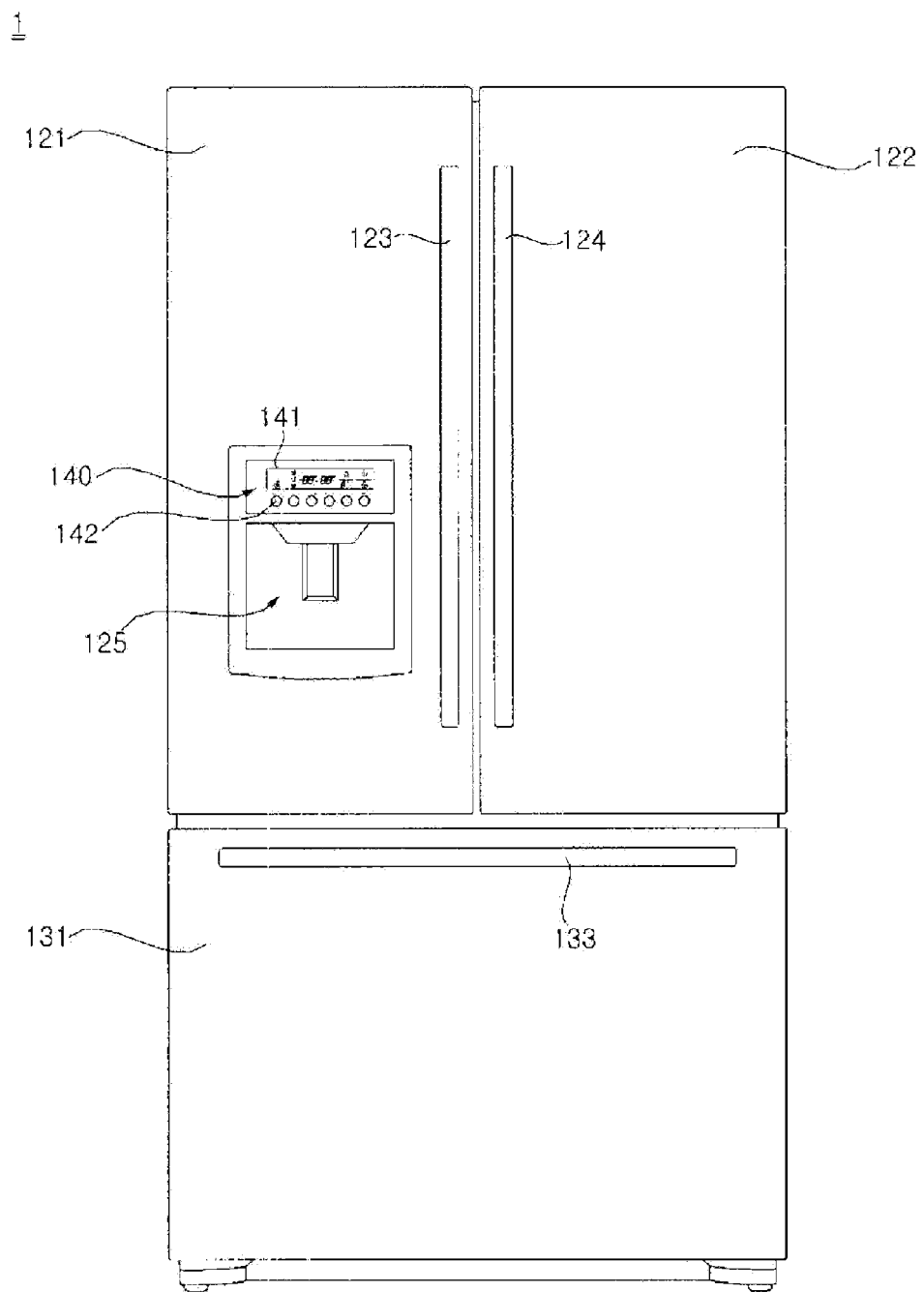
FIG. 2 is a front view of a refrigerator according to an embodiment of the present invention.
Figure 3:
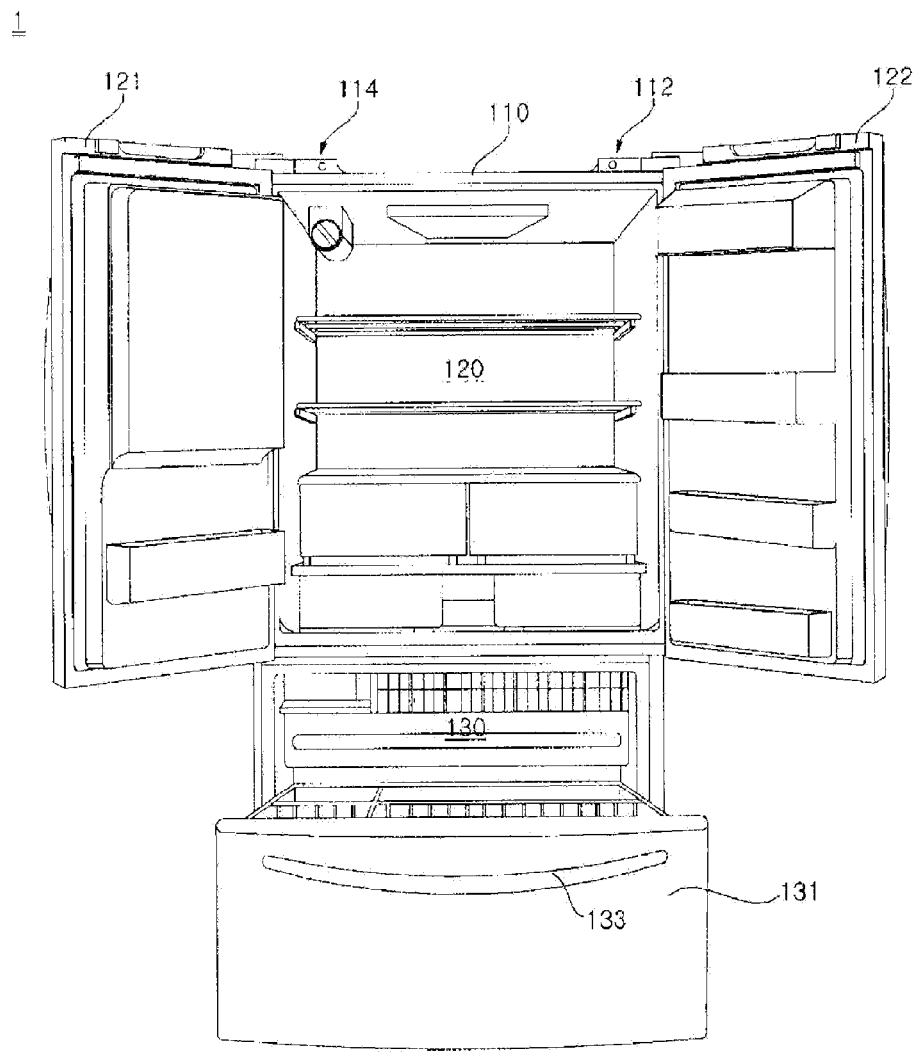
FIG. 3 shows the refrigerator shown in FIG. 1, with the doors opened.

FIG. 2 is a front view of a refrigerator according to an embodiment of the present invention. FIG. 3 shows the refrigerator shown in FIG. 1, with the doors opened. Referring to FIGS. 2 and 3, the refrigerator 1 according to an embodiment of the present invention forms an outer appearance from a casing 110 forming an inner space partitioned into a refrigerating compartment 120 and a freezing compartment 130, refrigerating compartment doors 121 and 122 opening and closing the refrigerating compartment 120, and a freezing compartment door 131 opening and closing the freezing compartment 130.

The refrigerating compartment doors 121 and 122 include a left refrigerating compartment door 121 rotatably connected to a left side of the casing 110 and a right refrigerating compartment door 122 rotatably connected to a right side of the casing 110.

The freezing compartment door 131 is coupled to be slidable along the casing 110 and may contain food therein. The freezing compartment door 131 slides inward of the casing 110. As received, the freezing compartment door 131 closes the freezing compartment 130 while pulled from the casing 110, and as withdrawn, opens the freezing compartment 130.

In this embodiment, the refrigerating compartment 120 is provided at an upper side of the casing 110, and the freezing compartment 130 is provided at an inner and lower side of the casing 110. The freezing compartment 130 is positioned under the refrigerating compartment 120. The refrigerating compartment 120 and the freezing compartment 130 are opened or closed by three doors. In other words, three-door type refrigerator. However, the present invention is not limited thereto and various embodiments may be included. For example, the inside of the casing may be partitioned into left and right parts, one of which is prepared as a freezing compartment, and the other as a refrigerating compartment, wherein the refrigerating compartment and the freezing compartment are selectively opened and closed by doors respectively provided at both sides of the casing—that is, the refrigerator may be configured as a two-door type refrigerator. Or, the refrigerator may be also embodied as a four-door type refrigerator which has a similar structure to that of the present embodiment except that one more freezing compartment is added that is opened and closed by a sliding door.

Meanwhile, the refrigerating compartment doors 121 and 122 are provided with refrigerating compartment door handles 123 and 124 by which a user may open and close the refrigerating compartment door 121, and the freezing compartment door 131 is provided with a freezing compartment door handle 133 by which a user may put in or pull out the freezing compartment door 131.

Meanwhile, a dispenser 125 is provided at a front side of the refrigerating compartment door 121. A user may take out ice or water through the dispenser 125. A control panel 140 is positioned at an upper side of the dispenser 125 to control the operation of the refrigerator 1 and to enable the state of the refrigerator 1 to be output as an image and/or sound through a displaying unit 141.

The control panel 140 includes a displaying unit 141 that visualizes state information or failure information of the refrigerator 1 and displays the information with a light emission body such as an LED, LCD, or organic EL, a sound output means that outputs a sound such as a buzzer or a speaker, and an input unit 142 that includes mechanical buttons or capacitive/resistive touch buttons through which a user may enter various operation commands.

The refrigerator 1 conducts a cycle in which a coolant circulates a coolant pipe and undergoes compression, expansion, evaporation, and condensation. As the coolant experiences a phase change during the cycle, heat exchange with ambient air occurs, so that refrigerating or freezing is carried out. For this purpose, the refrigerator 1 includes a compressor (183, refer to FIG. 5) for compressing the coolant, an expansion valve (not shown) for expanding the coolant, a heat exchanger (not shown) that functions as an evaporator for evaporating the coolant, and a heat exchange (not shown) playing a role as a condenser for condensing the coolant.

Further, the refrigerator 1 may further include a refrigerating compartment fan (184, refer to FIG. 5) for blowing cooled air to the refrigerating compartment 120, a freezing compartment fan (186, refer to FIG. 5) for blowing cooled air to the freezing compartment 130, and a sensing unit (190, refer to FIG. 5) for sensing the operation state of various components of the refrigerator 1.

Figure 4:
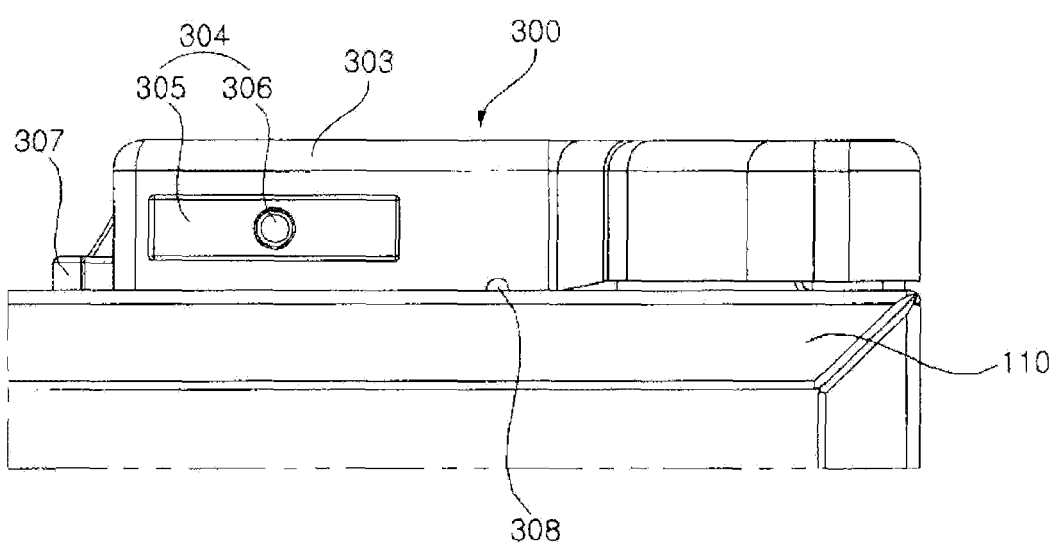
FIG. 4 is an expanded view of hinge parts as shown in FIG. 3.

FIG. 4 is an expanded view of hinge parts as shown in FIG. 3. Referring to FIGS. 3 and 4, the hinge parts rotatably couple the refrigerating compartment doors 121 and 122 of the refrigerator 1 to the casing 110. The hinge parts include a hinge part 114 coupling the left refrigerating compartment door 121 to the casing 110 and a hinge part 112 coupling the right refrigerating compartment door 122 to the casing 110. The hinge part 114 to which the left refrigerating compartment door 121 is coupled may have the same structure as the hinge part 112 to which the right refrigerating compartment door 122 is coupled, and the hinge part 112 to which the right refrigerating compartment door 122 is coupled is only described hereinafter.

The hinge part 112 is provided at a right and upper side of the casing 110 and allows the right refrigerating compartment door 122 to open and close the refrigerating compartment 120. Further, the hinge part 112 is provided with a door switch 304 that, when the right refrigerating compartment door 122 is opened or closed, switches on or off to thereby turning on or off a light (not shown) illuminating the refrigerating compartment 120. The door switch 304 turns off the light when the right refrigerating compartment door 122 is closed and turns on the light when the right refrigerating compartment door 122 is opened.

The hinge part 112 includes a hinge part housing 303 forming an outer appearance thereof, and the hinge part housing 303 includes a rotational shaft inserting part through which a rotation shaft (not shown) of the right refrigerating compartment door 122 is inserted and a coupling mount 307 having a coupling hole through which a coupling member such as a screw or bolt passes. The coupling member passes through the coupling hole and is coupled with the casing 110.

The door switch 304 includes a door switch connector 305 fixed to the hinge part housing 303 and a switching member 306 provided in the door switch connector 305. The switching member 306 is pushed inward of the door switch connector 305 by a pushing force of the right refrigerating compartment door 122 when the right refrigerating compartment door 122 is closed and springs back outward of the door switch connector 305 as the pushing force of the right refrigerating compartment door 122 is removed when the right refrigerating compartment door 122 is opened. The door switch 304 electrically connects a controller 160 to the switching member 306, so that in accordance with a switching operation of the switching member 306, the controller 160 may detect whether the refrigerating compartment 120 is opened or closed.

Meanwhile, the hinge part housing 303 includes, at its inside, a sound output unit 150 to output a signal sound including product information in a diagnosis mode. The sound output unit 150 may include a buzzer or a speaker.

Meanwhile, the hinge part housing 303 includes a signal sound output hole 308 which enables a signal sound output through the sound output unit 150 to propagate smoothly to the outside.

Figure 5:
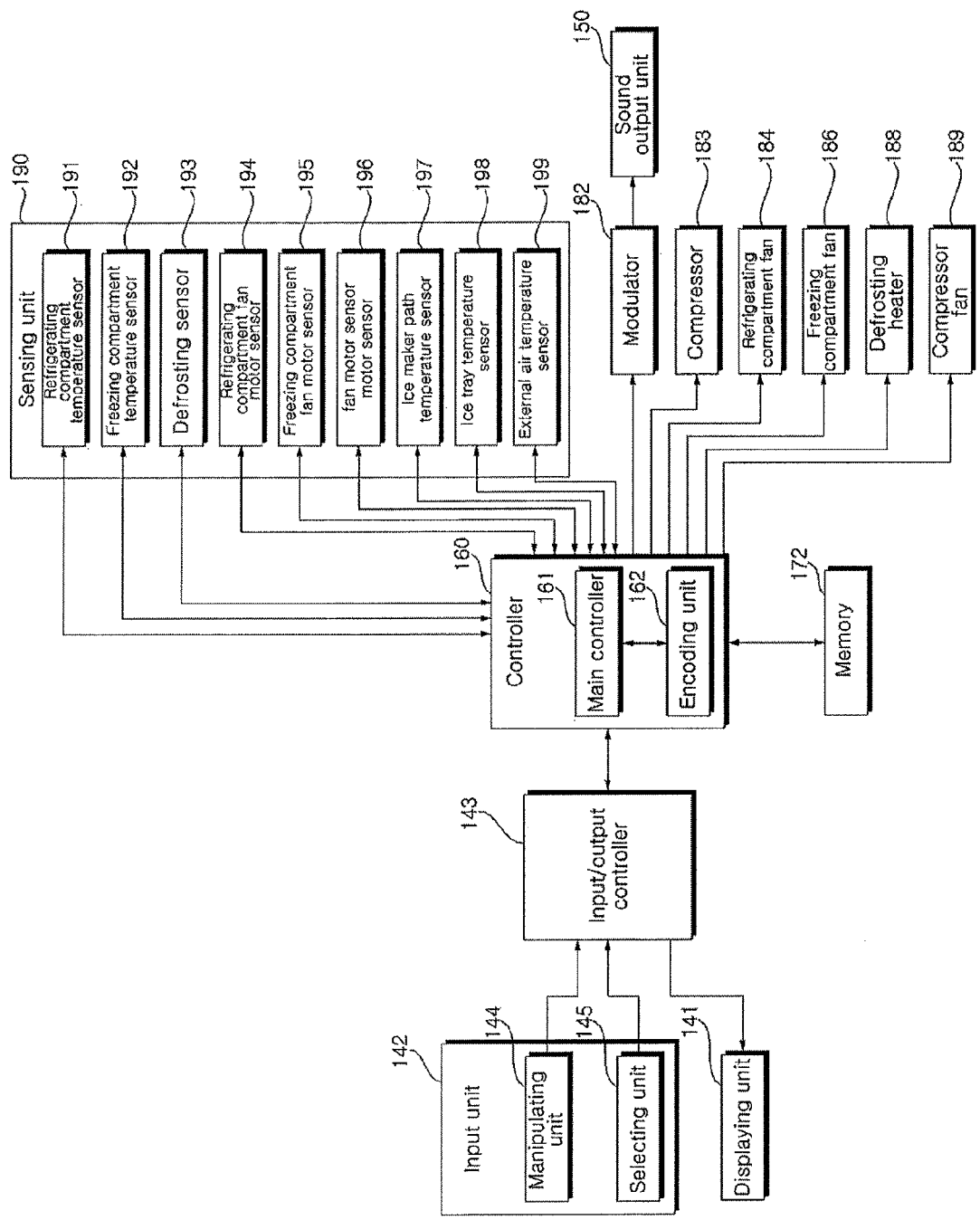
FIG. 5 is a block diagram illustrating main components of a refrigerator according to an embodiment of the present invention.

FIG. 5 is a block diagram illustrating main components of a refrigerator according to an embodiment of the present invention.

Referring to FIG. 5, the refrigerator 1 may include an input unit 142, a displaying unit 141, an input/output controller 143, a memory 172, a sensing unit 190, a modulator 182, a compressor 183, a refrigerating compartment fan 184, a freezing compartment fan 186, a defrosting heater 188, a compressor fan 189, a sound output unit 150, and a controller 160 for controlling the overall operation of the refrigerator.

The sensing unit 190 may include a refrigerating compartment temperature sensor 191 for sensing the temperature of the refrigerating compartment 120 and a freezing compartment temperature sensor 192 for sensing the temperature of the freezing compartment 130, and the sensing unit 190 may further include a defrosting sensor 193 for sensing the temperature of the surface of an evaporator to determine whether to perform a defrosting operation, a refrigerating compartment fan motor sensor 194 for sensing whether the refrigerating compartment fan 184 normally operates, a freezing compartment fan motor sensor 195 for sensing whether the freezing compartment fan 186 normally operates, and a condenser fan motor sensor 196 for sensing whether the compressor fan 189 normally operates to dissipate heat generated from the condenser when exchanging heat with a coolant.

The controller 160 analyzes the operation state of the refrigerator 1 based on information collected through various sensors constituting the sensing unit 190, and the input/output controller 143 performs control to enable the state information analyzed by the controller 160 to be displayed through the displaying unit 141.

More specifically, the input/output controller 143 functions as an interface between the input unit 142 and the displaying unit 141 provided in the control panel 140 and the controller 160. The input/output controller 143 transfers various control commands entered by a user through the input unit 142 to the controller 160 and enables images such as signs, characters, and/or icons to be displayed through the displaying unit 141 corresponding to the entered control commands, or when information sensed by the sensing unit 190 is transferred through the controller 160, enables state information to be displayed through the displaying unit 141 based on the sensed information.

The input unit 142 includes at least one input means for inputting a predetermined signal or data to the refrigerator 1 by a user's manipulation and the input unit 142 may include a manipulating unit 144 for receiving various control commands for operating the refrigerator 1 and a selecting unit 145 for receiving a diagnosis mode entry command for diagnosing the refrigerator 1.

The selecting unit 145 includes at least one input means, and when a diagnosis start command is received, applies a signal output command to the controller 160 so that a signal sound including product information is output through the sound output unit 150.

At this time, the selecting unit 145 may be constituted of a predetermined input means separately from the manipulating unit 144, but the present invention is not limited thereto. For example, a specific input means constituting the manipulating unit 144, which commonly functions as the manipulating unit 144, may be configured to play a role as the selecting unit 145 in accordance with a specific pressing pattern, such as when left pressed during a predetermined time or more or when repeatedly pressed within a predetermined time.

In the refrigerator 1 according to an embodiment of the present invention, the input unit 142 includes a lock button having a key lock function by which a user may lock the manipulating unit 144 and a freezing compartment temperature setting button for setting a temperature of the refrigerating compartment 120. When the lock button is pressed with the refrigerating compartment door 122 opened, the refrigerator enters into a lock mode, and then, enters into the diagnosis mode only when the freezing compartment temperature setting button is pressed before a preset time elapses. This may prevent the refrigerator from unnecessarily entering into the diagnosis mode due to a user's mistake in manipulation, so that the diagnosis mode may come in effect only when the user clearly intends to diagnose the refrigerator 1.

The memory 172 stores product information. As described above, the product information includes operation information sensed and accumulated through the sensing unit 190 during a predetermined time period while the refrigerator 1 is in operation.

Here, the product information may include at least one of identification information (product ID), configuration information (configuration), operation information, and malfunction information (error-detecting information).

The identification information is information for identifying the type of a target to be diagnosed by the diagnosing apparatus 200. As described below hereinafter, the diagnosing apparatus 200 may be configured to diagnose various home appliances such as a washing machine, an air conditioner, or a cooker as well as the refrigerator. The identification information may include information on a target to be diagnosed by the diagnosing apparatus 200.

The configuration information is information entered by a user for configuring functions of the refrigerator 1. Examples of the configuration information may include a freezing compartment set temperature, a freezing compartment target temperature, a refrigerating compartment set temperature, a refrigerating compartment target temperature, whether to select functions such as quick freezing, fast freezing, or express freezing set to swiftly lower the temperature of the freezing compartment in a short time, whether a refrigerator to be diagnosed has a dispenser through which ice or water is taken out, whether an air purifying mode is set to purify air in the refrigerating compartment or freezing compartment, whether a test mode is set to perform a pilot operation on the refrigerator, and whether a showcase mode is set for a showcase in a shop. Further detailed examples of the configuration information are represented in a user setting displaying area 330 shown in FIG. 9.

The operation information is information on the operation state of the 1 and may include time information on how long the product information currently stored in the memory 172 has been accumulated, the accumulated number of times in which the freezing compartment door has been opened during a preset time period, an accumulated time during which the freezing compartment door has been opened during a preset time period, an average temperature, a maximum temperature and/or a minimum temperature sensed by a temperature sensor during a preset time period, a driving time of the refrigerating compartment fan accumulated during a preset time period, the accumulated number of times in which the refrigerating compartment door has been opened during a preset time period, an accumulated time during which the refrigerating compartment door has been opened during a preset time period, an average temperature, a maximum temperature and/or a minimum temperature sensed by a refrigerating compartment temperature sensor during a preset time period, a driving time of the refrigerating compartment fan accumulated during a preset time period, an average temperature, a maximum temperature and/or minimum temperature sensed by an external air temperature sensor during a preset time period, an average temperature, a maximum temperature and/or a minimum temperature sensed by a freezing compartment defrosting sensor during a preset time period, an average temperature, a maximum temperature and/or minimum temperature sensed by a refrigerating compartment defrosting sensor during a preset time period, a time of freezing compartment defrosting and/or refrigerating compartment defrosting performed latest before diagnosis is conducted, a cycle of defrosting performed latest before diagnosis is conducted, and accumulated driving time of the compressor during a preset time period. Further detailed examples of the operation information are shown in FIG. 10.

The malfunction information is information regarding whether various components in the refrigerator normally operate.

The malfunction information may include information such as whether water is normally supplied to an ice maker, whether a water pad or ice pad provided in the dispenser 125 to provide water or ice to a user when pressed by the user normally operates, whether the freezing compartment temperature sensor 192, the refrigerating compartment temperature sensor 191, an external air temperature sensor 199, a freezing compartment defrosting sensor, a refrigerating compartment defrosting sensor or other various sensors normally operate, and whether a driving apparatus such as the freezing compartment fan or the refrigerating compartment fan normally operates.

When receiving a signal from the selecting unit 145 in accordance with entry into the diagnosis mode, the controller 160 performs control so that product information stored in the memory 172 is called, a control signal is generated in a predetermined format, and the control signal is applied to the modulator 182. Further, the controller 160 performs control to enable the sound output unit 150 to be operated as the selecting unit 145 is manipulated.

The controller 160 includes a main controller 161 that controls the flow of data input/output to/from the refrigerator and that enables the refrigerator 1 to be operated by generating a control command according to data entered from the sensing unit 190 and an encoding unit 162 that converts product information into a control signal of a predetermined format so as to output a sound in accordance with an input from the selecting unit 145.

The main controller 161 enables a start sound to be output to inform that a diagnosis mode is initiated through the sound output unit 150 when the refrigerator enters into the diagnosis mode in accordance with an input from the 145 and enables predetermined data to be displayed through the displaying unit 141 to inform that the diagnosis mode is conducted. At this time, the input/output controller 143 may be positioned as an interface between the main controller 161 and the displaying unit 141, as described above.

Further, the main controller 161 controls the sound output unit 150 so that when a control signal generated from the encoding unit 162 is applied to the modulator 182 and is output through the sound output unit 150, a predetermined alert sound is output before and after the signal sound is output. In some cases, outputting the alert sound may be omitted.

Meanwhile, when having two or more sound output units 150, the refrigerator 1 may separately include a first sound output unit for outputting product information or failure information of the refrigerator 1 and a second sound output unit for outputting various alert notice messages or alert sounds to a user in accordance with the operation state of the refrigerator.

Upon entry into the diagnosis mode, the main controller 161 may stop the manipulating unit 144 except for the selecting unit 145 and power button from operating. As described above, in this embodiment, a specific manipulation key—the freezing compartment temperature setting button—is left pressed during a constant time with the manipulation keys locked by the lock button, thereby entering into the diagnosis mode. Accordingly, before the lock button is released, keys other than the power button and the freezing compartment temperature setting button whose function is limited by entry into the diagnosis mode are subjected to restricted operation.

The encoding unit 162 calls the product information stored in the memory 172, encodes the product information in a predetermined scheme, and adds a preamble and an error check bit to the data signal, thereby generating a control signal of a predetermined format. The encoding unit 162 generates a control signal constituted of a plurality of symbols by encoding the product information.

Further, the encoding unit 162 splits the control signal to a predetermined size to thereby constitute a packet of a plurality of frames when generating the control signal. Further, the encoding unit 162 may set an IFS (Inter Frame Space) so that no sound is output between frames of the control signal and may set a dead time in the symbols in a section where data values are changed so as to remove an echo sound effect that affects conversion of a next signal, which is based on a recharge-discharge principle upon signal conversion.

Regarding the plurality of symbols constituting the control signal, the length of each symbol is referred to as symbol time. When the basic length of a frequency signal constituting a sound output through the sound output unit 150 corresponding to the symbol is also referred to as symbol, the encoding unit 162 may set a dead time within the symbol time for one symbol. At this time, the dead time varies in length depending on the length of the symbol time.

Here, the product information is data consisting of a combination of 0's and 1's and is a digital signal readable by the controller 160. The controller 160 classifies the data of the product information, enables specific data to be included in accordance with the operation of the refrigerator, divides the data to a predetermined size or sums to generate a control signal of a designated standard, and applies the control signal to the modulator 182.

Further, the controller 160 may change the number of symbols corresponding to a frequency signal output in accordance with the number of carrier frequencies used in the modulator 182.

At this time, the controller 160 enables the number of symbols of the control signal corresponding to the number of frequency signals to be changed in accordance with the number of frequencies used in the modulator 182. That is, in case the number of frequencies used is $2^n$ symbols of the control signal is rendered to correspond to one frequency signal.

For example, in case the modulator 182 outputs a sound with the sound output unit 150 controlled using two frequencies, the controller 160 controls the modulator 182 so that one symbol of the control signal is converted into one frequency signal. When four frequencies are used, the controller 160 enables two symbols of the control signal to correspond to one frequency signal, and when eight frequencies are used, the controller 160 enables three symbols of the control signal to correspond to one frequency signal.

At this time, the symbol time may also vary depending on the number of symbols corresponding to one frequency signal.

The modulator 182 applies a predetermined driving signal to the sound output unit 150 corresponding to a control signal applied from the controller 160 so that a signal sound is output through the sound output unit 150. Accordingly, the signal sound thusly output includes product information.

The modulator 182 applies a signal to the sound output unit 150 so that a predetermined frequency signal corresponding to one symbol is output during the symbol time with respect to the symbols constituting the control signal.

At this time, the modulator 182 enables a sound to be output corresponding to the control signal by using a plurality of frequency signals and enables the number of symbols per frequency signal to be changed according to the number of used frequencies corresponding to a setting of the controller 160 so that the changed substantially is output.

That is, in case two frequencies are used as described above, a frequency signal per symbol is output during a preset time, and in case four frequencies are used, one frequency signal per two symbols of the control signal may be output.

Thus, according to the number of frequencies used in the modulator 182, the frequency bandwidth and length of a sound output through the sound output unit 150 varies. Whenever the number of used frequencies doubles, the total length of an output sound (total time during which the sound is output) is reduced by a half.

The modulator 182 includes a frequency oscillator (not shown) generating an oscillation frequency per frequency corresponding to the number of usable frequencies and enables a predetermined frequency signal to be output through the sound output unit 150 corresponding to the control signal.

When controlling the sound output unit 150 to output a signal sound corresponding to the control signal of the controller 160, the modulator 182 uses any one of a frequency shift keying, amplitude shift keying, and phase shift keying to convert the signal.

Here, frequency shift keying converts a signal into a signal of a predetermined frequency corresponding to a data value of the control signal, and the amplitude shift keying converts a signal to have different amplitudes from each other corresponding to a data value. Further, phase shift keying converts a signal to have different phases from each other in accordance with a data value.

Figures 6, 7:
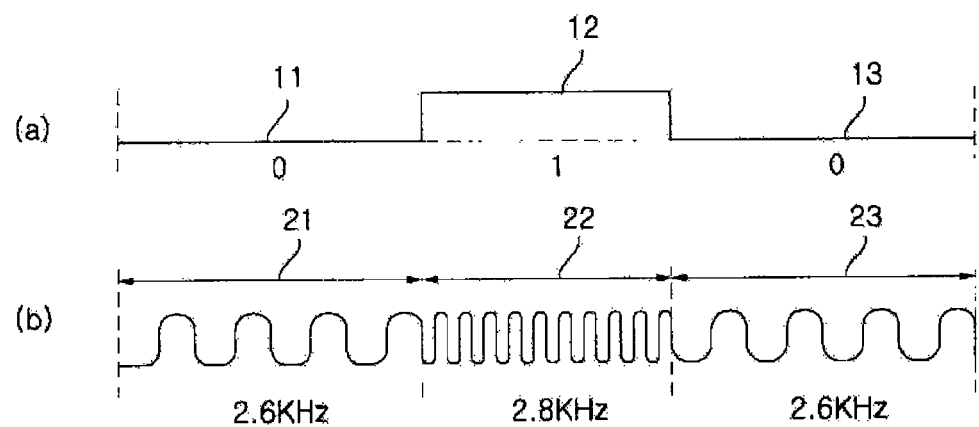
FIG. 6 shows frequency conversion performed by a modulator in a refrigerator according to an embodiment of the present invention.
FIG. 7 shows a structure of a control signal generated by encoding product information.

Among frequency shift keying schemes, binary frequency shift keying (hereinafter, "BFSK") performs conversion to a first frequency when the data value of the control signal is 0 and conversion to a second frequency when the data value is 1. For example, in case the data value is 0, conversion to a signal having a frequency of 2.6 khz is performed, and in case the data value is 1, conversion to a signal having a frequency of 2.8 khz is conducted. This is the same as shown in FIG. 6 which is described below.

Further, amplitude shift keying performs conversion to a signal having a frequency of 2.6 khz. In case the data value of the control signal is 0, conversion to a signal having a frequency of 2.6 khz which has an amplitude of 1 is performed, and in case the data value is 1, conversion to a signal having a frequency of 2.6 khz which has an amplitude of 2 may be done.

Although the modulator 182 is described as using frequency shift keying, for example, this may be changed. Further, the frequency band as used is merely an example, and thus may be varied.

In case a dead time is set in the control signal, the modulator 182 stops signal conversion during the section where the dead time is set. At this time, the modulator 182 performs signal conversion using pulse width modulation (PWM), and in the section where the dead time is set, turns off the oscillation frequency for modulation so that frequency signal conversion is temporarily paused during the dead time. Accordingly, a sound from which echo effects have been removed between symbols is output through the sound output unit 150.

The operation of the sound output unit 150 is turned on and off in response to a control command from the controller 160 and outputs a signal of a predetermined frequency corresponding to the control signal for a predetermined time under the control of the modulator 182, thereby outputting a predetermined signal sound including product information.

At this time, at least one sound output unit 150 is provided, preferably, two or more sound output units may be provided. For example, in case two sound output units are provided, one of the sound output units outputs a predetermined sound including product information, and the other thereof may output an alert sound or effect sound corresponding to state information of the refrigerator. Or, a notice sound may be output before the diagnosis mode is entered into or a sound is output.

The sound output unit 150 outputs the control signal as a predetermined signal sound corresponding to an output from the modulator 182, and if the output is ended, then stops operation. In case the selecting unit 145 is manipulated again, the operation is conducted again through the above-described process, thereby outputting a predetermined signal sound including the product information.

Further, upon entry into the diagnosis mode, the sound output unit 150 outputs a start sound informing that the diagnosis mode is started corresponding to a control command from the main controller 161 and outputs a predetermined notice sound when the output of the signal sound including the product information is started and ended.

Corresponding to the control command from the main controller 161, the displaying unit 141 displays on the screen information entered by the selecting unit 145 and the manipulating unit 144, operation state information of the refrigerator 1, and information generated as the refrigerator completes its operation. Further, when the refrigerator malfunctions, failure information relating to the malfunction is displayed on the screen.

Further, if the diagnosis mode is initiated corresponding to the control command from the main controller 161, the displaying unit 141 displays the diagnosis mode and when a sound is output through the sound output unit 150 may display a progress state in the form of at least one of a letter, an image, or a numeral.

FIG. 6 shows frequency conversion performed by a modulator in a refrigerator according to an embodiment of the present invention.

Referring to FIG. 6, as described above, a control signal encoded by a predetermined scheme by the encoding unit 162 is frequency converted by the modulator 182 and is output as a signal sound through the sound output unit 150.

The modulator 182 uses frequency shift keying adopting two frequencies of 2.6 khz and 2.8 khz, for example. Here, 2.6 khz and 2.8 khz belong to an audible frequency bandwidth, in particular, a frequency bandwidth over which transmission may be smoothly performed through a phone network. The modulator 182 enables a frequency of 2.6 khz to be output corresponding to logic value 0 and a frequency of 2.8 khz to be output corresponding to logic value 1.

As shown in FIG. 6a, in case a control signal is 010, the modulator 182 performs conversion to a signal 21 having a frequency of 2.6 khz since the first bit value is 0 and conversion to a signal 22 having a frequency of 2.8 khz since the second bit (12) value is 1. Since the third bit (13) value is 0, conversion is performed to a signal 23 having a frequency of 2.6 khz.

At this time, in case each bit in the control signal is one symbol, the length of symbol is symbol time, and one frequency signal is output corresponding to one symbol, the basic unit of the frequency signal constituting the output sound may become the symbol time.

FIG. 7 shows a structure of a control signal generated by encoding product information.

As shown in FIG. 7a, the encoding unit 162 constitutes a packet with a plurality of frames. The encoding unit 162 adds a product number (product ID) and version information to product information which is data for diagnosis. This is performed by an application layer. The size of the entire packet is 60 bytes, with one byte of version information, product number of 7 bytes, and product information of 52 bytes, for example.

At this time, the version information is related to a version of a diagnosis algorithm and is version information for the diagnosis algorithm or the entire diagnosis system and means protocol name information corresponding thereto.

For example, in case a version is represented as 0x01 as shown in FIG. 7b, the protocol name means 'Smart Diagnosis for Refrigerator Machine V1.0'. The product number is an identifier for identifying the product, and the diagnosis data is product information for diagnosing faults of the refrigerator.

The version and the identification number (product ID) is directly entered by the controller 160.

In contrast, the diagnosis data, i.e., the product information is stored in the memory 172. Accordingly, if smart diagnosis is started, the controller 160 loads data stored in the memory 172 and temporary data as the product information, i.e., diagnosis data.

Figure 8:
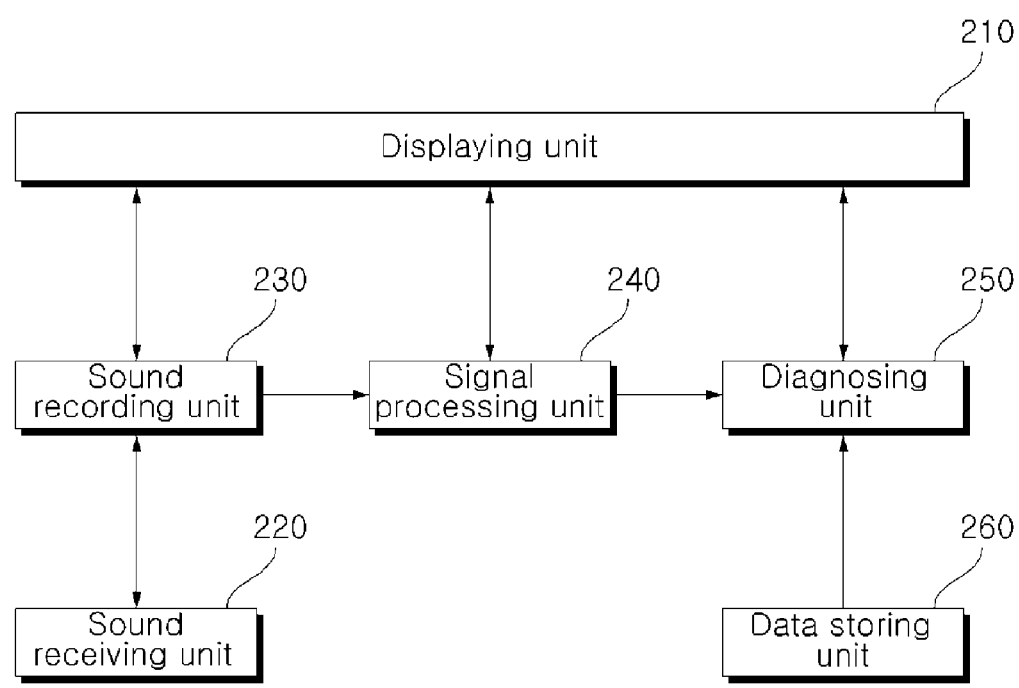
FIG. 8 is a block diagram illustrating main components of a diagnosing apparatus according to an embodiment of the present invention.

FIG. 8 is a block diagram illustrating main components of a diagnosing apparatus according to an embodiment of the present invention. Referring to FIG. 8, the diagnosing apparatus 200 includes a displaying unit 210, a sound receiving unit 220, a sound recording unit 230, a sound processing unit 240, a diagnosing unit 250, a data storing unit 260, and a server controller (not shown) for controlling the overall operation of the diagnosing apparatus.

The displaying unit 210 displays various types of information including a diagnosis process state and/or a diagnosis result of the home appliance 1 in such a way that an operator may recognize the information.

The sound receiving unit 220 receives a signal sound through a communication network. As described above in connection with FIG. 1, a signal sound including product information output from the refrigerator 1 is transmitted through a phone and a communication network connected to the phone and is entered to the sound receiving unit 220.

A manager of the service center informs a user of smart diagnosis as described above, and then, manipulates an input means of the input unit so that a signal sound received through the user's terminal 81 is received by the diagnosing apparatus through the sound receiving unit 220.

The sound recording unit 230 records the signal sound received through the sound receiving unit 220. The sound recording unit 230 may record the signal sound received through the sound receiving unit 220 in the wave file format. At this time, the diagnosing apparatus 200 may include a recording medium such as a RAM, a hard disk, or a nand flash memory to record the signal sound file.

The signal processing unit 240 inversely extracts the product information from the signal sound recorded in the sound recording unit 230. The signal processing unit 240 demodulates the wave file constituting the signal sound and decodes a signal generated as a result of the demodulation, thereby extracting the product information.

At this time, the signal processing unit 240 converts the recorded analog signal sound into bit stream data, stores the bit stream data, detects a preamble, and extracts the product information for the refrigerator based on the preamble. In such process, the signal processing unit 240 demodulates the recorded data and decodes the demodulated data, thereby extracting the product information.

The signal conversion performed by the signal processing unit 240 is inverse conversion of the signal conversion performed in the refrigerator 1. It is preferable that the refrigerator 1 and the signal processing unit 240 perform data conversion using the same signal conversion system through a mutual agreement. Here, the signal processing unit 240 may perform decoding using the Viterbi decoding algorithm corresponding to the encoding scheme performed in the refrigerator. The signal processing unit 240 converts an analog signal sound of a predetermined frequency bandwidth into a digital signal through inverse conversion using any one of frequency shift keying, amplitude shift keying, and phase shift keying.

Further, if the signal sound is recorded in the sound recording unit 230, the signal processing unit 240 detects an error that occurs while the signal sound is received through the communication network or an error that occurs during the recording process and determines whether the signal is a normal signal.

At this time, the signal processing unit 240 analyzes the recorded data and examines whether the signal sound has been normally recorded or whether the signal sound is normal. When an error is detected, the signal processing unit 240 performs a predetermined correction process to fix the error. However, in some cases, despite such error correction, it may be difficult to restore the erroneous data to the normal data.

In case the signal sound recorded in the signal processing unit 240 is not a normal signal, recording of the signal sound being incomplete is output through the displaying unit 210 and re-output of a signal sound from the refrigerator is requested.

At this time, an operator of the service center identifies what is output from the displaying unit 210 and may request a user of the refrigerator to re-output the signal sound through the terminal 81.

In case the signal sound is a normal signal, the signal processing unit 240 completes recording and displays through the displaying unit 210 that the recording has been normally done.

The diagnosing unit 250 analyzes the product information extracted by the signal processing unit 240 and performs diagnosis on the refrigerator 1 based on the product information. The diagnosing unit 250 performs diagnosis in association with the data storing unit 260.

As a great amount of product information is included in the signal sound output from the refrigerator 1, the diagnosing unit 250 analyzes each data item included in the product information and diagnoses the refrigerator according to a correlation between data items.

The data storing unit 260 stores diagnosis logics and diagnosis data items. The data structure stored in the data storing unit 260 may include a table storing at least one diagnosis logic (hereinafter, 'diagnosis logic table') and a table storing at least one diagnosis data item (hereinafter, 'diagnosis data table'). The diagnosis logic table and the diagnosis data table may be separately managed per type according to the diagnosis target.

For example, the diagnosing apparatus 200 need not be configured to diagnose only refrigerators, and may be configured to diagnose home appliances other than refrigerators. In such case, the diagnosis logic table may store a washing machine diagnosis logic for diagnosing a washing machine and a refrigerator diagnosis logic for diagnosing a refrigerator separately from the washing machine diagnosis logic. Likewise, the diagnosis data table may store data items necessary to diagnose a washing machine and data items necessary to diagnose a refrigerator separately from the data items for the washing machine.

The signal sound output from the refrigerator 1 may include product identification information and thus the type of a diagnosis target may be identified through the product information extracted through the signal processing unit 240. Accordingly, the diagnosing unit 250 may call the data items used for diagnosis of the refrigerator and the refrigerator diagnosis logic from the data storing unit 260 and may perform diagnosis.

Figure 9:
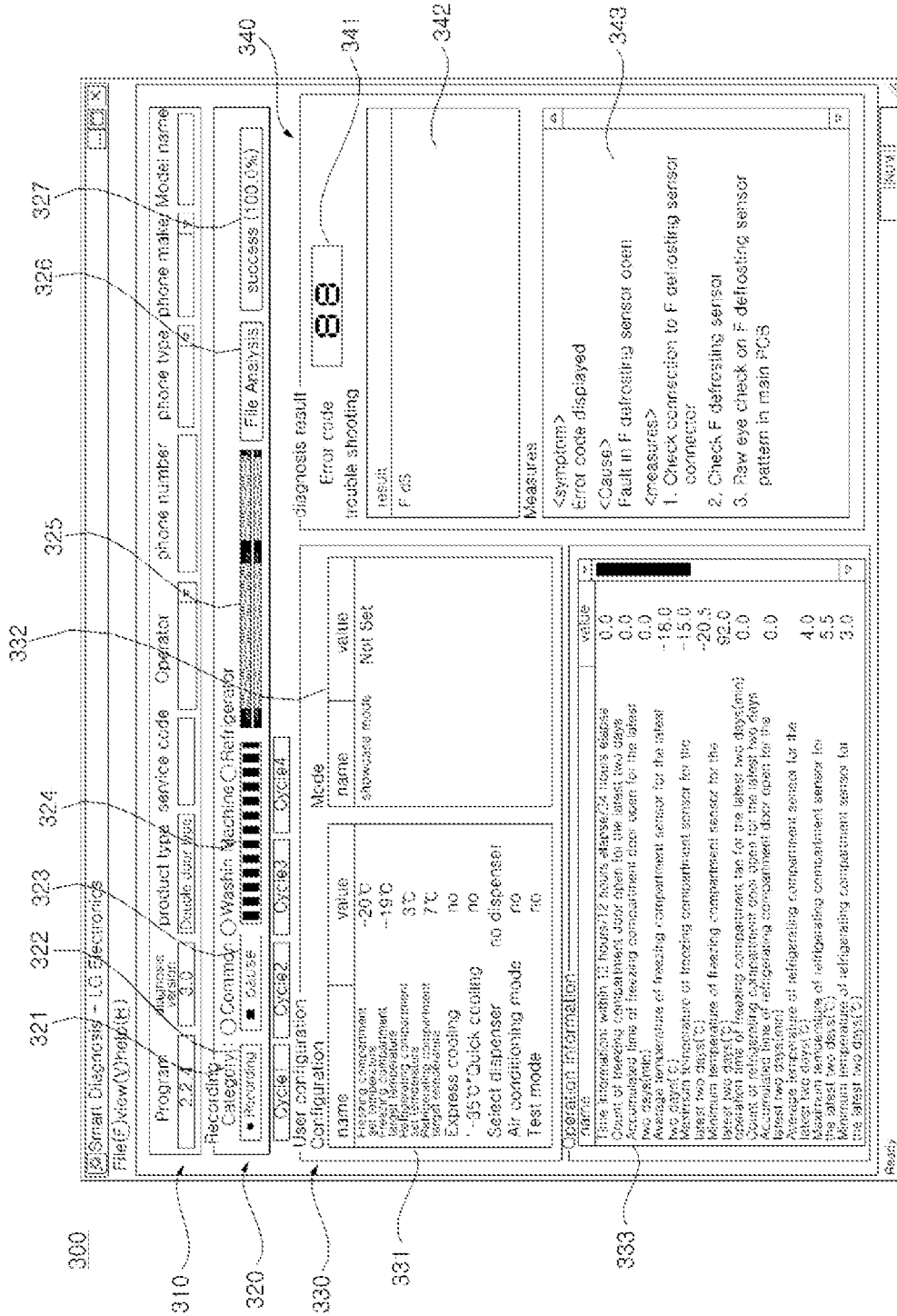
FIG. 9 shows a user interface (UI) displayed on the displaying unit of FIG. 8.

FIG. 9 shows a user interface (UI) displayed on the displaying unit of FIG. 8. FIG. 10 specifically enumerates operation information displayed on the operation information displaying area of FIG. 9.

Referring to FIG. 9, the user interface displayed through the displaying unit 210 of the diagnosing apparatus may include at least one of product identification information displaying area 310, a diagnosis progress state displaying area 320, a user setting displaying area 330, and a diagnosis result displaying area 340.

The product identification information displaying area 310 may display the type of a home appliance to be diagnosed. The diagnosing unit 250 grasps the type of a product which is a diagnosis target from the identification information included in the product information extracted from the signal processing unit 240 and displays a result on the product identification information displaying area 310. In this embodiment, the refrigerator as a diagnosis target is, for example, a double door type refrigerator with left and right doors for opening and closing the refrigerating compartment or the freezing compartment.

The diagnosis progress state displaying area 320 may include at least one of a category selection area 321, a recording start selection area 322, a recording pause selection area 323, a recording progress state displaying area 324, a waveform displaying area 325, a diagnosis start selection area 326, and a diagnosis success rate displaying area 327.

The category selection area 321 is provided to select a home appliance to be diagnosed, and is automatically selected by the diagnosing unit 250 or manually selected by an operator based on the product information extracted from the signal processing unit 240.

The recording start selection area 322 is selected by an operator. If a predetermined start signal constituting the start part of the signal sound output from the refrigerator 1 is verified with a call to a user connected, the recording start selection area 322 is selected. If the recording start selection area 322 is selected, the sound recording unit 230 starts recording the signal sound received through the sound receiving unit 220.

If the recording pause selection area 323 is selected, the recording currently in progress is paused. The sound recording unit 230 stops recording that is currently on the go.

The recording progress state displaying area 324 displays a recording progress state of the sound recording unit 230. In this embodiment, a bar is displayed as an example, which increases in length as the recording is in progress.

The waveform displaying area 325 displays the waveform of a signal sound entered to the sound receiving unit 220 as an image. An operator may figure out whether the signal sound currently being recorded experiences a loss or distortion from the waveform image. In case it is determined that the loss or distortion of the signal sound is severe and re-recording is needed, the operator may take proper measure through the recording pause selection area 323 and the recording start selection area 322.

If the diagnosis start selection area 326 is selected, diagnosis is carried out through an analysis of the signal sound recorded by the sound recording unit 230. At this time, the signal processing unit 240 extracts the product information from the signal sound recorded by the sound recording unit 230 and the diagnosing unit 250 performs diagnosis based on the product information extracted through the sound recording unit 230. The detailed description of the process of performing diagnosis through the sound recording unit 230 and the diagnosing unit 250 are skipped.

The user setting displaying area 330 displays at least one of configuration information and operation information included in the product information extracted through the signal processing unit 240.

More specifically, the user setting displaying area 330 may include at least one of a configuration information displaying area 331 displaying configuration information, a mode configuration displaying area 332 displaying whether the refrigerator 1 is currently set in a showcase mode, and an operation information displaying area 333 displaying operation information.

Based on the product information extracted through the signal processing unit 240, configuration information is displayed on the configuration information displaying area 331, and whether a showcase mode, which may be grasped from the configuration information, is set may be separately displayed on the mode configuration displaying area 332.

As shown in FIG. 10, operation information is specifically displayed on the operation information displaying area 333.

The operation information extracted from the product information and figures thereof are displayed on the operation information displaying area 333.

The diagnosis result displaying area 340 may include at least one of a malfunction information displaying area 341, a failure diagnosis result displaying area 342, and a measure displaying area 343.

When the product information extracted from the signal processing unit 240 includes malfunction information, the malfunction information displaying area 341 displays the malfunction information.

The failure diagnosis result displaying area 342 displays whether the refrigerator 1 is broken which is figured out as a result of the diagnosis performed by the diagnosing unit 250.

The measure displaying area 343 may display a symptom of the refrigerator 1, a cause of the symptom, and a measure to fix the symptom. An operator may check the measure displaying area 343 and may advise a measure to a user or a service person.

Figure 11:
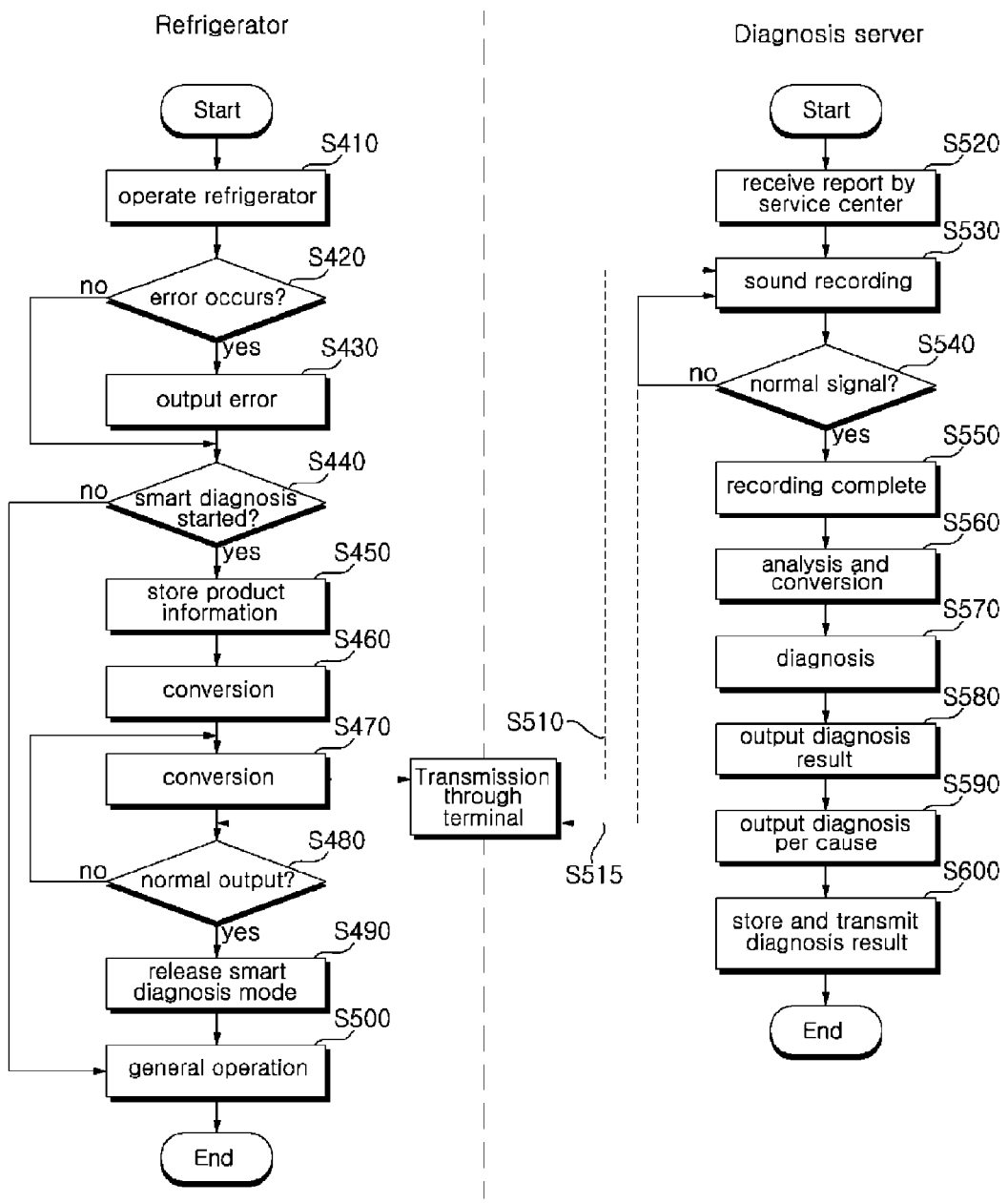
FIG. 11 is a flowchart illustrating a diagnosing method performed by a diagnosing apparatus and a method of outputting a signal sound from a refrigerator.

FIG. 11 is a flowchart illustrating a diagnosing method performed by a diagnosing apparatus and a method of outputting a signal sound from a refrigerator. Referring to FIG. 11, if product information is converted into a predetermined signal sound and is output from the refrigerator 1, the signal sound is transmitted to a service center connected to a user's phone through a communication network.

If the refrigerator 1 causes an error at, e.g., a sensor therein while in operation (S420), an error is output on the displaying unit 141 according to the error by the controller 160 or the input/output controller 143 (S430). The error may be output on the displaying unit 141 provided at a front surface of the refrigerator 1 in the form of alert light or an error message.

Meanwhile, when an error occurs or even when no error occurs but smart diagnosis is selected by entry through the selecting unit 145 or a plurality of manipulating units 144, the controller 160 enables the refrigerator to enter into a diagnosis mode.

At this time, the controller 160 configures product information including operation information, usage information, and failure information through data stored in the memory 172 and stores it (S450).

At this time, the dated included in the product information includes data set in the refrigerator or data measured or generated while in operation or may be any one of types of data recently stored according to the type of data, accumulatively stored data, data storing the number of times, and average data. For example, as temperature data, average data obtained for the latest two days may be used. The product information added with version information and a predetermined number is encoded by the encoding unit 162 and is modulated by the modulator 182 (S460) and is output as a signal sound through the sound output unit 150.

Meanwhile, in case an error is displayed from the refrigerator or no error occurs but a user of the refrigerator determines there is an error, the user contacts the service center 200, and the service center 200 receives the failure report (S520).

At this time, the user enables the refrigerator to enter into the smart diagnosis mode by manipulating the selecting unit 145 or the manipulating unit 144 as described above following the service center's guide while on the phone, and if a signal sound is output, brings the phone or mobile terminal close to the sound output unit 150 of the refrigerator to thereby let the signal sound transferred to the service center 200 as a sound signal.

Although entering into the smart diagnosis mode, the refrigerator 1 normally performs the operation of, e.g., the compressor, so as to maintain the refrigerator's unique refrigerating functions while functions of setting the refrigerator's functions or changing the temperature are left locked.

The output signal sound is transmitted to the service center 200 through the user's terminal 81, i.e., phone or portable terminal (S510).

A manager of the service center provides the user with a guide to the smart diagnosis as described above and then manipulates an input means of the input unit so that the signal sound received through the user's terminal 81 is received by the diagnosing apparatus through a sound receiving unit 220.

The signal sound received through the sound receiving unit 220 is recorded by the sound recording unit 230 (S530).

If the signal sound is recorded in the sound recording unit 230, the signal processing unit 240 detects an error that occurs during the recording process or an error that occurs while the signal sound is received through the communication network and determines whether it is a normal signal (S540).

At this time, the signal processing unit 240 determines whether the signal sound is normally recorded or whether the signal sound is normal by analyzing the recorded data. The signal processing unit 240 performs a correcting process of correcting an error that is detected, and in some cases, even when performing the correcting process, it may be difficult to restore it to the normal data.

In case the recorded signal sound is not a normal signal, the signal processing unit 240 enables the displaying unit 210 to indicate that recording of the signal sound is not complete and requests re-output of a signal sound of the refrigerator (S515). At this time, the manager of the service center identifies what is output from the displaying unit and may request through the terminal 81 that the user of the refrigerator re-output a sound.

The refrigerator 1 determines in response to the re-output request that the signal sound has not been normally output (S480) and re-outputs a signal sound through the sound output unit 150 by using modulated data (S470).

The thusly output signal sound is sent back to the service center through the communication network by the terminal 81 (S510), and the diagnosing apparatus of the service center re-records the received signal sound (S530).

In case of the signal sound is a normal signal, the signal processing unit 240 completes recording and displays what indicates that the recording has been normally complete through the displaying unit 210 (S550).

If no separate re-output request is received or being complete is set by a user, the refrigerator determines that the signal sound has been normally output, releases the diagnosis mode, and resumes the general operation (S500).

Meanwhile, in the diagnosing apparatus of the service center, if recording of the signal sound is normally complete, the signal processing unit 240 analyzes and converts the data so that the data may be readable (S560).

At this time, the signal processing unit 240 converts the recorded analog signal sound data into bit stream data and stores the bit stream data, detects a preamble, and based on the detected preamble, extracts product information on the refrigerator. In such process, the signal processing unit 240 performs demodulation on the recorded data and decodes the demodulated data, thereby extracting product information.

At this time, the signal conversion performed by the signal processing unit 240 is an opposite process of the signal conversion performed by the refrigerator 1. It is preferable that the refrigerator 1 and the signal processing unit 240 convert data through the same signal conversion system by mutual agreement. Here, the signal processing unit 240 may perform decoding using a Viterbi decoding algorithm corresponding to the encoding scheme of the refrigerator. The signal processing unit 240 converts an analog signal sound of a predetermined frequency bandwidth into a digital signal through inverse conversion using any one of frequency shift keying, amplitude shift keying, and phase shift keying.

The product information of the refrigerator detected by the signal processing unit 240 is transferred to the diagnosing unit 250, and the diagnosing unit 250 compares the data stored in the data storing unit 260 with the product information of the refrigerator and analyzes the data, thereby diagnosing the state of the refrigerator (S570).

Upon completion of the diagnosis, the signal processing unit 240 outputs a diagnosis result to the displaying unit 210 (S580).

At this time, the diagnosing unit 250 displays on an area of the screen at least one of basic information, configuration information, and operation information of the refrigerator based on the product information of the refrigerator as shown in FIGS. 9 and 10 as described above and displays on another area of the screen of the displaying unit 210 a failure cause related to the state of the refrigerator.

Further, in case there are a plurality of failure causes, a list may be displayed. If one of the plurality of failure causes is selected, a detailed description of each failure cause and measures for responding thereto are displayed on another area of the displaying unit 210 (S590).

The server controller stores the diagnosis result in the data storing unit 260, and in some cases, transmits the diagnosis result data to any one of the terminal 81, the refrigerator 1 and a repair person's terminal 93 (S600).

Figure 12:
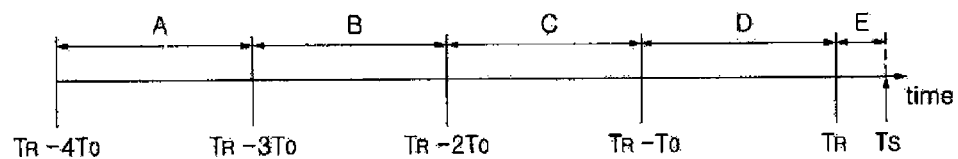
FIG. 12 shows how product information is accumulated in a refrigerator according to an embodiment of the present invention.

FIG. 12 shows how product information is accumulated in a refrigerator according to an embodiment of the present invention. Referring to FIG. 12, after power is supplied to the refrigerator 1, data is stored in the memory 172 at a predetermined period. The data stored in the memory 172 is updated at a predetermined period TO.

For example, in case the amount of data that may be stored in the memory 172 is set as product information stored during a maximum of 5 TOs, as shown in FIG. 12, assuming that a start time of a diagnosis mode currently in progress is TS, and a time of the latest data update done from TS is TR, the controller 160 deletes what is stored in the memory 172 before section A at time TR and adds data during section E (TR–TS) to the memory 172 after time TR. Accordingly, the signal sound output through the sound output unit 150 includes product information at sections A, B, C, D, and E.

Figure 13:
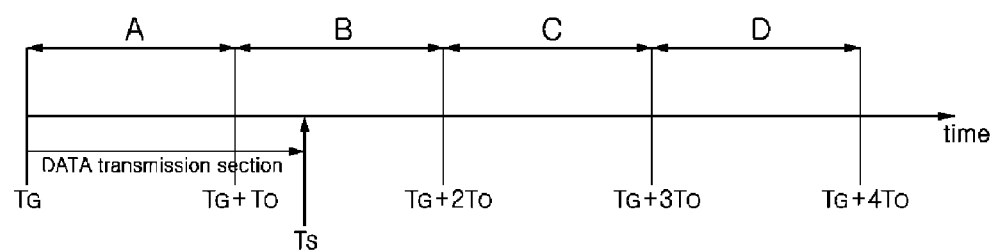
FIG. 13 shows a process of accumulating product information of a refrigerator from a power-on time according to an embodiment of the present invention.

FIG. 13 shows a process of accumulating product information of a refrigerator from a power-on time according to an embodiment of the present invention. Referring to FIG. 13, in case a diagnosis mode is executed before a set time (e.g., 5 periods TO) passes from the refrigerator 1 powers on, the product information stored in the memory 172 is still left without being deleted, and thus, a signal sound output through the sound output unit 150 includes the whole product information that is stored from a time TG that the refrigerator 1 is powered on to a time TS that diagnosis is executed.

For example, as shown in FIG. 13, in case the diagnosis execution time TS is positioned in section B, a signal sound output through the sound output unit 150 includes product information in section A (TG to TG+TO) and in section B (TG+TO to TS).

While the diagnosis mode is entered into and diagnosis is thus performed, the signal sound output from the refrigerator 1 includes information during a predetermined time period before the diagnosis execution time TS, and in the instant embodiment product information accumulated during a maximum of 5 TOs may be included.

Meanwhile, the product information accumulated in the memory 172 may include the number of times of door opening accumulated during a latest set time period from the diagnosis execution time TS and the number of times of door opening accumulated during each period is stored in the memory 172.

The controller 160 may sense whether a door is opened according to a signal applied from a door switch (refer to FIG. 4) operating when the door is opened or closed.

Referring back to FIG. 12, the number of times of door opening accumulated during the latest one period before section A at the data update time TR is deleted from the refrigerator 1, and the number of door opening accumulated from the data update time TR to the diagnosis execution time TS is additively stored.

The controller 160, upon diagnosis, sums the number of door opening accumulated and stored during each period, thereby generating operation information. Accordingly, the operation information includes the number of times of door opening accumulated in the whole sections A, B, C, D, and E.

Of course, as shown in FIG. 13, in case the memory 172 is not updated at once after the power-on time TG, operation information is generated according to the number of times of door opening accumulated from the power-on time TG to the diagnosis execution time TS.

Referring to FIGS. 9 and 10, the values accumulated in the memory 172 may be displayed on an operation information displaying area 333 as the number of times of freezing compartment door opening accumulated for the latest two days, refrigerating compartment door opening time (min) accumulated for the latest two days, freezing compartment fan driving time (min) accumulated for the latest two days, the number of times of refrigerating compartment door opening accumulated for the latest two days, refrigerating compartment door opening time (min) accumulated for the latest two days, refrigerating compartment fan driving time (min) accumulated for the latest two days, and compressor driving time (min) accumulated for the latest two days.

Here, the values displayed on the operation information displaying area 333 are the ones accumulated for the latest two days from the latest data update time TR and from the data update time TR to the diagnosis execution time TS in case one period TO is set as 12 hours. Accordingly, the "for the latest two days" displayed on the operation information displaying area 333 should be understood as "for a minimum of past two days from the diagnosis execution time TS." Of course, this case is an example in which the diagnosis execution time TS is 48 hours after the power-on time TG.

FIGS. 14 to 17 show examples of product information generated in a refrigerator according to an embodiment of the present invention.

Figure 14:
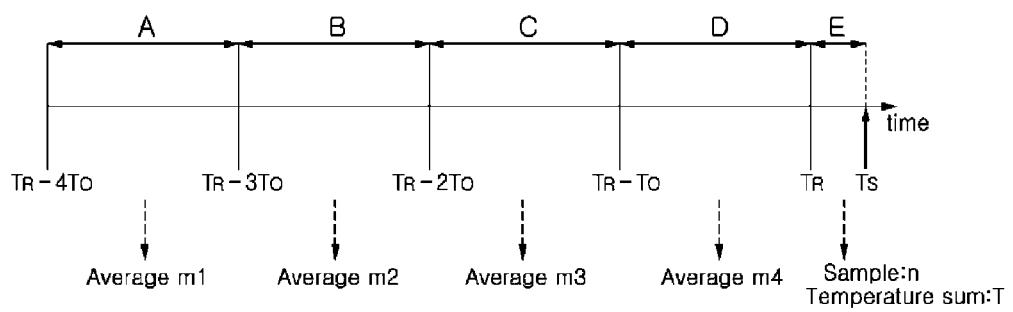
FIGS. 14 to 17 show examples of product information generated in a refrigerator according to an embodiment of the present invention.

Referring to FIG. 14, average values of values sensed by the sensing unit 190 during each period may be stored in the memory 172. After the refrigerator 1 is powered on, a per-period average value of values sensed by the sensing unit 190 is stored in the memory 172 at every period TO.

The average values stored in the memory 172 are newly updated at a constant period TO.

The sensing unit 190 has been described above in connection with FIG. 5 and a detailed description thereof is skipped, and hereinafter, the sensing unit 190 is a freezing compartment temperature sensor 192, for example.

The freezing compartment temperature sensor 192 senses the temperature of the freezing compartment at a constant time interval. Hereinafter, the freezing compartment temperature sensor 192 senses the temperature of the freezing compartment at an interval of TO/240.

Based on the values sensed by the freezing compartment temperature sensor 192, the controller 160 calculates a per-period average temperature at each period. FIG. 14 shows an example in which temperature averages at sections A, B, C, and D are m1, m2, m3, and m4, respectively.

Each average is an average of 240 temperature values sensed by the freezing compartment temperature sensor 192 during a corresponding period TO, and an average Mt in the whole sections A, B, C, D, and E may be obtained by Equation 1 below. Here, section E is a time during which one period TO is not yet passed from time TR. In section E, a total T of temperature values sensed by the freezing compartment temperature sensor 192 $n$ times (number of samples) is calculated, and then, is divided by n, thereby obtaining an average.

$$Mt = \frac{m1 + m2 + m3 + m4 + T}{240*4 + n} \quad \text{[Equation 1]}$$

The controller 160 generates operation information including an average Mt of the temperatures of the freezing compartment in sections A to E as obtained by the above method and the whole product information including the operation information is output as a signal sound through the sound output unit 150.

Meanwhile, referring to FIGS. 9 and 10, the values sensed by the sensing unit 190 may be displayed on the operation information displaying area 333 as an average temperature sensed by the freezing compartment temperature sensor for the latest two days, an average temperature sensed by the refrigerating compartment temperature sensor for the latest two days, an average temperature sensed by the external air temperature sensor for the latest two days, an average temperature sensed by the freezing compartment defrosting sensor for the latest two days, and an average temperature sensed by the refrigerating compartment defrosting sensor for the latest two days.

Here, the values displayed on the operation information displaying area 333 are average values of values sensed by the sensing unit 190 for past two days from the latest data update time TR and values sensed from the data update time TR to the diagnosis execution time TS in case one period TO is set as 12 hours. Further, two evaporators are provided in the refrigerator 1 for the freezing compartment and the refrigerating compartment, and a refrigerating compartment defrosting sensor and a freezing compartment defrosting sensor are separately provided to sense the surface temperatures of the evaporators, respectively.

Figure 15:
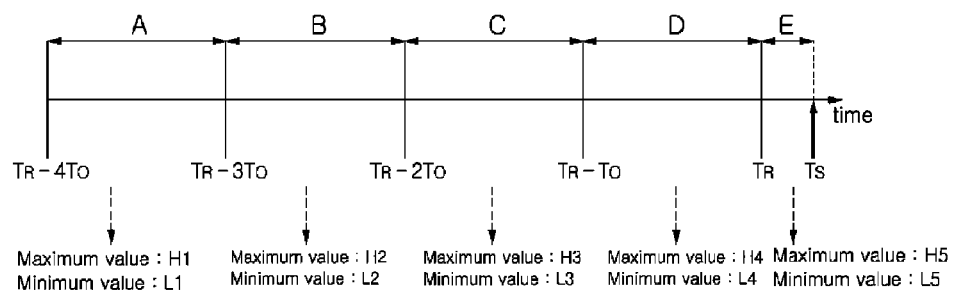

Referring to FIG. 15, the memory 172 may store a maximum value and a minimum value of temperature values sensed by a temperature sensor during each period TO. The temperature sensor may be any one of the refrigerating compartment temperature sensor 191, the freezing compartment temperature sensor 192, the defrosting sensor 193, the ice maker temperature sensor 198, and the external air temperature sensor 199 as shown in FIG. 5, and hereinafter, the freezing compartment temperature sensor 192 is provided as an example to describe a process of storing a maximum temperature value.

The freezing compartment temperature sensor 192 senses the temperature of the freezing compartment at a constant time interval. Hereinafter, the freezing compartment temperature sensor 192 senses the temperature of the freezing compartment at an interval of TO/240, for example. Based on values sensed by the freezing compartment temperature sensor 192, the controller 160 stores a per-period maximum value in the memory 172. For example, the memory 172 may store a maximum value H1 of values sensed by the freezing compartment temperature sensor 192 during section A, a maximum value H2 of values sensed by the freezing compartment temperature sensor 192 during section B, a maximum value H3 of values sensed by the freezing compartment temperature sensor 192 during section C, and a maximum value H4 of values sensed by the freezing compartment temperature sensor 192 during section D.

At the diagnosis execution time Ts, the memory 172 stores the maximum values H1, H2, H3, and H4 in sections A, B, C, and D, respectively, and the maximum value H5 in section E. Here, H1, H2, H3, and H4 are obtained at TR−4TO, TR−3TO, TR−2TO and TR−TO that are end points in the respective sections and that are data update times, and H5 is obtained at the diagnosis execution time TS. Here, section E is a time period before one period TO elapses from time TR, for example.

Meanwhile, the operation information includes the largest value of the maximum values H1, H2, H3, H4, and H5 in the respective sections A to E. The controller 160 generates operation information including the maximum temperature value of the freezing compartment in the whole sections A to E as obtained by the above method, and entire product information including the operation information is output as a signal sound through the sound output unit 150.

Meanwhile, FIG. 15 shows minimum values L1, L2, L3, L4, and L5 of temperature values sensed by the freezing compartment temperature sensor 192 in the sections A to E. The method of obtaining the values is the same as the above-described method of obtaining the maximum temperature values except that among temperature values sensed by the freezing compartment temperature sensor 192 the minimum value, rather than the maximum value, is obtained. Accordingly, in such case, the operation information includes the smallest value of the minimum values L1, L2, L3, L4, and L5 in sections A to E, respectively. The controller 160 generates operation information including the minimum value of the temperatures of the freezing compartment in the whole sections A to E as obtained by the above method, and product information including the operation information is output as a signal sound through the sound output unit 150.

Meanwhile, referring to FIGS. 9 and 10, the maximum value or minimum value of the values sensed by the sensing unit 190 may be displayed on the operation information displaying area 333 as the maximum temperature of the freezing compartment temperature sensor sensed for the latest two days, the minimum temperature of the freezing compartment temperature sensor sensed for the latest two days, the maximum temperature of the refrigerating compartment temperature sensor sensed for the latest two days, the minimum temperature of the refrigerating compartment substantially sensed for the latest two days, the maximum temperature of the external air temperature sensor sensed for the latest two days, the minimum temperature of the external temperature sensor sensed for the latest two days, the maximum temperature of the defrosting sensor sensed for the latest two days, the minimum temperature of the freezing compartment defrosting sensor sensed for the latest two days, the maximum temperature of the refrigerating compartment defrosting sensor sensed for the latest two days, and the minimum temperature of the refrigerating compartment defrosting sensor sensed for the latest two days.

Here, the values displayed on the operation information displaying area 333 is the maximum value or minimum value of the values sensed by the sensing unit 190 for past two days from the latest data update time TR and from the data update time TR to the data execution time TS in case one period TO is set as 12 hours.

Further, two evaporators are provided in the refrigerator 1 for the freezing compartment and the refrigerating compartment, and a refrigerating compartment defrosting sensor and a freezing compartment defrosting sensor are separately provided to sense the surface temperatures of the respective evaporators.

Figure 16:
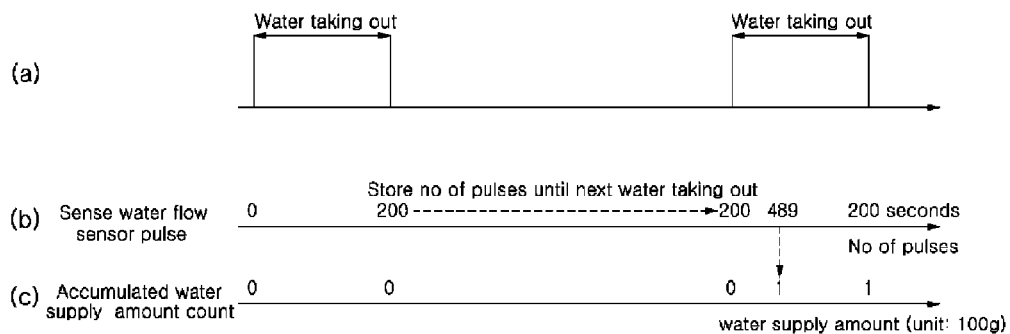

Referring to FIG. 16, if the water pad in the dispenser operates so that water is taken out as shown in FIG. 12a, a waver flow sensor operates and senses a pulse corresponding to the amount of water taken out according to the water flow as shown in FIGS. 16b and 16c, the refrigerator 1 counts the amount of water accumulated.

At this time, the water flow sensor operates not only when the water pad operates so that water is taken out but also when water is fed into the ice tray. Accordingly, the amount of water taken out is calculated only for the amount of flowing water measured by the water flow sensor when water is taken out, that is when the water pad is operated except for the amount of water supplied to the ice tray of the ice maker.

If water taking out is done as shown in FIG. 16b, the pulse value of the water flow sensor at the time that water taking out is done is stored, and then, values are counted from the pulse value stored when next water taking out is performed. For example, if the pulse value of the water flow sensor measured at first water taking out is 200 pulses, the 200 pulses is stored, and upon next water taking out, the amount is counted from the 200 pulses.

Further, the number of times is counted as water is taken out as shown in FIG. 16c, with the measure value of the water flow sensor counted once every 489 pulses. That is, if the amount of flowing water measured by the water flow sensor reaches 489 pulses, the number of times has one more count, and the count for the amount of flowing water accumulated continues to be accumulated and stored.

At this time, the reference of the count on the amount of flowing water accumulated—489 pulses—is a pulse value of the water flow sensor corresponding to about 100 g of water.

That is, the number of times being 1 means that 100 g (or not less than 100 g and not more than 200 g) of water has been taken out.

As such, the amount of water taken out is stored based on the pulse value measured by the water flow sensor and the accumulated count of the amount of flowing water. The amount of water taken out is initialized every 12 hours and is newly stored with 12 hours set as one section.

Further, the accumulated number of times of water supply is stored as a value of data for the amount of water taken out during one section (12 hours). As described above, an accumulated water supply amount of 1 corresponds to 489 pulses of the water flow sensor and this may be converted into about 100 g of water. Accordingly, an accumulated water supply amount of 250 corresponds to about 25 litters when one count is calculated as 100 g.

The amount of water taken out during one section (12 hours) is stored up to an accumulated water supply amount of 250 (number of times), and when water is supplied 250 times or more during one section, that is, when 25 litters or more of water is taken out, data for the amount of water taken out is set as the maximum set value.

That is, if 25 litters or less of water is taken out during one section (12 hours), the taken out amount, i.e., the counted value of the accumulated water supply amount according to the pulse value sensed by the water flow sensor is stored as 1 to 250, and if 25 litters or more of water is taken out, the amount of water taken out is stored with the maximum set value set as 252.

As the amount of water taken out from the refrigerator, data is stored for each of four sections for up to 48 hours, with one section set as 12 hours. If the amount of water taken out for one section is stored, the value measured by the water flow sensor for water taking out and the number of times of the accumulated water supply amount are initialized and counting is resumed from 0.

If the amount of water taken out is stored for up to four sections in 48 hours, the data for the oldest section is deleted at a time of storing the next one section of data.

As such, the refrigerator 1 stores 48 hours of data every 12 hours for each section, and when entering into the smart diagnosis mode, outputs a signal sound including the stored amount of water taken out in the product information.

Accordingly, the diagnosing apparatus receives information on the amount of water taken out for the latest two days in the refrigerator.

Figure 17:
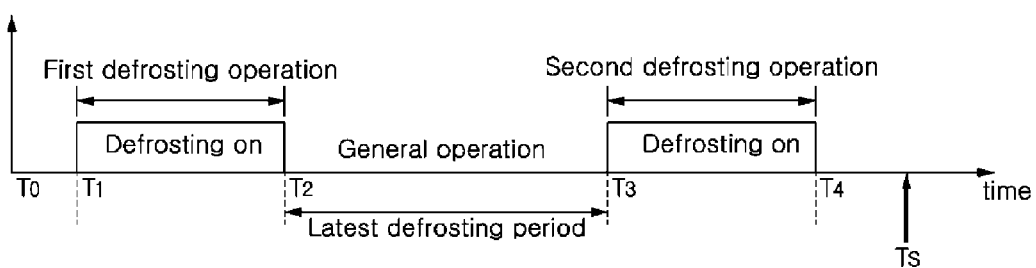

Referring to FIG. 17, in the refrigerator 1 according to an embodiment of the present invention, the controller 160 obtains the latest defrosting operation period from the diagnosis execution time TS and generates operation information including the defrosting operation period. The operation information including the defrosting operation period is included in the whole product information, and the sound output unit 150 outputs a signal sound according to the product information.

The operation information may include the period of the latest defrosting operation from the data execution time TS. Here, the defrosting operation period may be obtained from a difference between the start time T3 of the latest defrosting operation performed from the data execution time TS and the end time T2 of the defrosting operation performed before the latest defrosting operation.

As is well known, when a coolant is evaporated in an evaporator of the refrigerator, the refrigerator's cooling is conducted by evaporation heat taken out away from the surroundings. At this time, moisture in the surroundings is frozen thereby causing frost on the evaporator. The frost is a primary factor that deteriorates the efficiency of the evaporator and thus needs to be removed. Accordingly, the refrigerator includes a defrosting heater electrically generating heat to melt the frost on the evaporator and a means to properly control the defrosting heater. Here, evaporators tend to be provided in the refrigerating compartment and the freezing compartment, respectively, so as to enhance cooling performance of the refrigerator, and accordingly, defrosting heaters are separately provided as a freezing compartment defrosting heater and a refrigerating compartment defrosting heater.

Thus, the defrosting operation may be performed to remove frost from the refrigerating compartment evaporator or from the freezing compartment evaporator. Hereinafter, the evaporator may be the refrigerating compartment evaporator or the freezing compartment evaporator. There may be provided a defrosting sensor (193, refer to FIG. 5) for sensing the temperature state of each evaporator, and the controller 160 determines whether to perform a defrosting operation by comparing a temperature value sensed by each defrosting sensor with a set condition for performing a defrosting operation of the corresponding evaporator.

Unlike this, the controller 160 may perform control so that a defrosting operation is performed according to an operation time of the compressor 183. If the accumulated continuous operation time of the compressor 183 is not less than a predetermined set time, the controller 160 performs control so that the defrosting heater 188 is operated. The defrosting heater 188 may be provided in each evaporator and removes frost on the evaporator as the defrosting heater creates heat. While a defrosting operation is in operation, the controller 160 preferably controls the compressor 183 so that the operation of the compressor 183 is stopped.

Meanwhile, the end time of the defrosting operation may be determined according to the operation time. In such case, when the operation time of the defrosting heater 188 is not less than a predetermined set time, the defrosting time ends. The controller 160 may enable the defrosting operation to be terminated by stopping the operation of the defrosting heater 188.

Unlike this, the end time of the defrosting operation may be determined depending on a temperature value sensed by the defrosting sensor 193. In such case, when the temperature value sensed by the defrosting sensor 193 while the defrosting operation is performed is not less than a predetermined set temperature, the defrosting operation is terminated. When the temperature value sensed by the defrosting sensor 193 while the defrosting operation is performed is not less than a predetermined set temperature, the controller 160 may enable the defrosting operation to be terminated by stopping the operation of the defrosting heater 188.

Referring back to FIG. 17, in the refrigerator 1 according to an embodiment of the present invention, when a first defrosting operation is performed in section [T1, T2], and a second defrosting operation is performed in section [T3, T4], information on the end time T2 of the first defrosting operation and the start time T3 of the second defrosting operation is stored in the memory 172. The controller 160 calculates a defrosting operation period T3−T2 from a difference between the start time T3 of the second defrosting operation and the end time T2 of the first defrosting operation.

The operation information may include a time of performing the first defrosting operation or the second defrosting operation, and as shown in FIGS. 9 and 10, on the operation information displaying area 333 may be displayed a time (latest F defrosting time (min)) of performing the latest freezing compartment defrosting operation from the data execution time TS and a time (latest R defrosting time (min)) of performing the latest refrigerating compartment defrosting operation from the data execution time TS.

Meanwhile, under the situation where a defrosting operation is controlled to be conducted according to the operation time of the compressor, the second defrosting operation may be performed under the condition where the compressor is continuously operated for a predetermined time or more after the first defrosting operation. In such case, the operation information may include a time of the latest operation of the compressor from the second defrosting operation as well as a defrosting operation period.

The operation information thusly configured transfers the defrosting operation period together with information on the operation time of the compressor to the service center 200, and the diagnosing unit 250 may perform more correct diagnosis through the operation information.

For example, in case a user frequently opens the refrigerating compartment door or the freezing compartment door, the defrosting operation period is generally shortened. In case the defrosting period grasped through the operation information is excessively short and the operation time of the compressor is relatively long, the diagnosing unit 250 may, as a result of the diagnosis, suggest the user to check whether the freezing compartment door or refrigerating compartment door properly stays closed or to check if the user too frequently opened the freezing compartment door or the refrigerating compartment door. Further, as described above, the operation information may include the number of times of door opening or time of door opening, and in such case, the diagnosing unit 250 may more correctly diagnose the refrigerator 1 collectively considering the defrosting operation period, operation time of the compressor, the number of times of door opening, and time of door opening.

Meanwhile, in FIGS. 12 to 17, a signal sound is output through the sound output unit 150 after the data execution time TS, and when a predetermined reset set time elapses, information stored in the memory 172 may be deleted. In such case, if a diagnosis execution command is reapplied through the selecting unit 145 before the reset set time passes, the controller 160 generates product information including operation information created upon the previous diagnosis. Accordingly, the sound output unit 150 outputs the same signal sound as the signal sound output when the previous diagnosis is performed.

Figure 18:
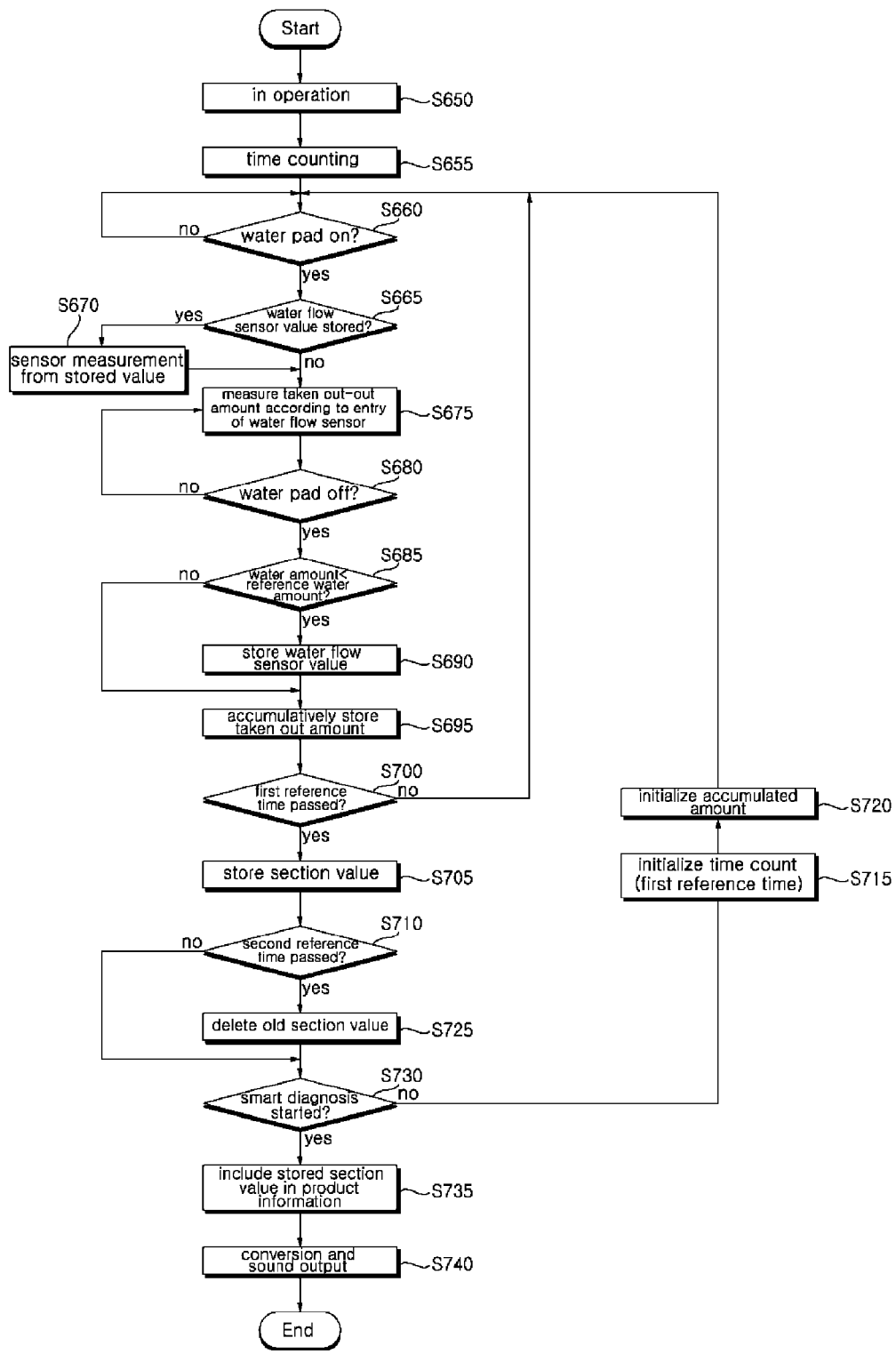
FIG. 18 is a view illustrating a data storing method for the amount of water taken out from a refrigerator.

FIG. 18 is a view illustrating a data storing method for the amount of water taken out from a refrigerator.

Referring to FIG. 18, while in operation, the refrigerator 1 stores data for the amount of taken-out water as obtained for 48 hours, i.e., two days, with one 12 hours set as one section. In case a new section of data is stored, the existing time count and related data are initialized, and then, time count begins (S655).

As the amount of taken-out water, the accumulated water supply amount for the amount measured by the water flow sensor when the water pad is in operation is counted and stored. As described above, in the refrigerator 1, if the water pad in the dispenser operates and water is taken out as shown in FIG. 16*a*, the water flow sensor operates as shown in FIGS. 16*b* and 16*c* and senses a pulse for the amount of taken-out water according to the water flow and counts the accumulated water flow amount accordingly.

At this time, the water flow sensor operates when water is fed to the ice tray as well as when the water pad operates so that water is taken out. Accordingly, the amount of taken-out water is calculated only on the amount of flowing water measured by the water flow sensor when water is taken out, that is, when the water pad is operated except for the amount of water supplied to the ice tray of the ice maker.

If the water pad operates, i.e., when the water pad turns on (S660), a value measured by the water flow sensor is stored (S675). At this time, in case there is a previously stored water flow sensor value (S665), a water flow sensor value is subsequently measured from the previously stored water flow sensor value (S675).

The amount of flowing water is measured by the water flow sensor until the water pad is turned off, and when the water pad is turned off (S680), the amount of flowing water is calculated based on the values measured by the water flow sensor until the water pad is turned off.

At this time, even when the water pad is turned off, the water flow sensor may still operate, but the value measured at this time may be not necessarily considered included in the amount of taken-out water. Therefore, only the value measured while the water pad is in operation is calculated as the amount of taken-out water.

If the amount of flowing water measured while the water pad is in operation is less than a reference value, the water flow sensor value is stored (S690). At this time, the count according to the accumulated water supply amount is stored as the amount of taken-out water, and if it is less than the reference value, the existing count is maintained (S695).

As described above in connection with FIG. 16b, if water taking out is ended, the pulse value obtained by the water flow sensor at the time that water taking out is ended is stored, and counting is resumed after a pulse value stored when next water taking out is performed.

For example, if the pulse value obtained by the water flow sensor as measured when first water taking out is done is 200 pulses, the 200 pulses is stored and then the amount is counted from the 200 pulses when a second water taking out process is started.

Meanwhile, if the measured water amount reaches a reference value or more, the accumulated water supply amount based on the reference value is increased by 1 and counted, and the count for the accumulated water supply amount is accumulatively stored as the amount of taken-out water (S695).

At this time, the reference value corresponds to about 100 g of water and corresponds to a pulse value of 498 pulses obtained by the water flow sensor. However, this value may vary depending on the type or manufacturer of the water flow sensor, and is not limited thereto. The reference value may be changed.

That is, if the amount of taken-out water reaches 100 g, the accumulated water supply amount is increased by 1.

As described above in connection with FIG. 16c, the number of times of water taking out is counted. If the water amount measured by the water flow sensor reaches 489 pulses, it gains one more count, and the count for the accumulated water supply amount continues to be accumulatively stored.

That is, if the number of times is 1, this means that 100 g (or not less than 100 g and less than 200 g) of water has been taken out.

Until the counted time reaches a first reference time (S700), the water amount taken out while the water pad is in operation is counted as described above (S660 to S700).

Meanwhile, at the first reference time, the controller 160 stores the count for the accumulatively stored accumulated water supply amount as a section value.

Here, the first reference time corresponds to one section and is about 12 hours. That is, the amount of taken-out water measured by the water flow sensor with 12 hours set as one section is stored, initialized, and then newly stored.

As such, the amount of taken-out water is stored based on the pulse value measured by the water flow sensor and the counted value for the accumulated water supply amount.

At this time, the amount of taken-out water per section (12 hours) is stored as the counted value for the accumulated water supply amount. If the counted value is not more than 250, this counted value is stored as the section value, and if the counted value is in excess of 250, 252 is stored. Here, "accumulated water supply amount is 250" means about 25 litters since one count corresponds to 100 g of water.

If 25 litters or less of water is taken out during one section (12 hours), the taken out amount, i.e., the counted value for the accumulated water supply amount according to the pulse value sensed by the water flow sensor is stored as the amount of taken-out water in the range of 1 to 250. If 25 litters or more of water is taken out, the amount of taken-out water is stored with the maximum value set as 252.

That is, if the amount of taken-out water during one section is 25 litters or less, the corresponding value is stored as the section value, and when 25 litters or more of water is taken out, the maximum value, 252, which means 25 litters or more, is stored as the section value.

After the section value is stored, it is determined whether the second reference time is passed (S710). In case it is less than the second reference time and smart diagnosis is not initiated (S730), the water flow sensor value stored during the first reference time, the count for the accumulated water supply amount, and the count for the first reference time are initialized (S715 and S720), and data for a new section is stored (S660 to S705).

As such, if the amount of taken-out water is stored for each section and the second reference time comes along (S710), the value for the oldest section is deleted (S725). Here, the second reference time is about 48 hours and corresponds to four sections.

In case a new section value is stored with the amount of taken-out water stored for four sections, the oldest section value is deleted and only the data for the latest 48 hours is maintained and stored.

Meanwhile, if smart diagnosis is initiated while the amount of taken-out water is stored every 12 hours as described above (S730), product information is generated including stored section values, i.e., four section values for the latest 48 hours (S735). At this time, the product information also includes information on a water pressure related to the amount of taken-out water. The refrigerator 1 converts the product information and outputs a signal sound through the sound output unit 150 (S740).

Accordingly, upon entry into the smart diagnosis mode, the refrigerator 1 outputs the product information as a signal sound, including in the product information data for the amount of taken-out water for the latest 48 hours as stored for each section with respect to the corresponding time.

The diagnosing apparatus of the service center receives the signal sound, extracts the product information, and diagnoses the state for the refrigerator according to the amount of taken-out water in the refrigerator using data for the amount of taken-out water for the latest 48 hours included in the product information.

Figure 19:
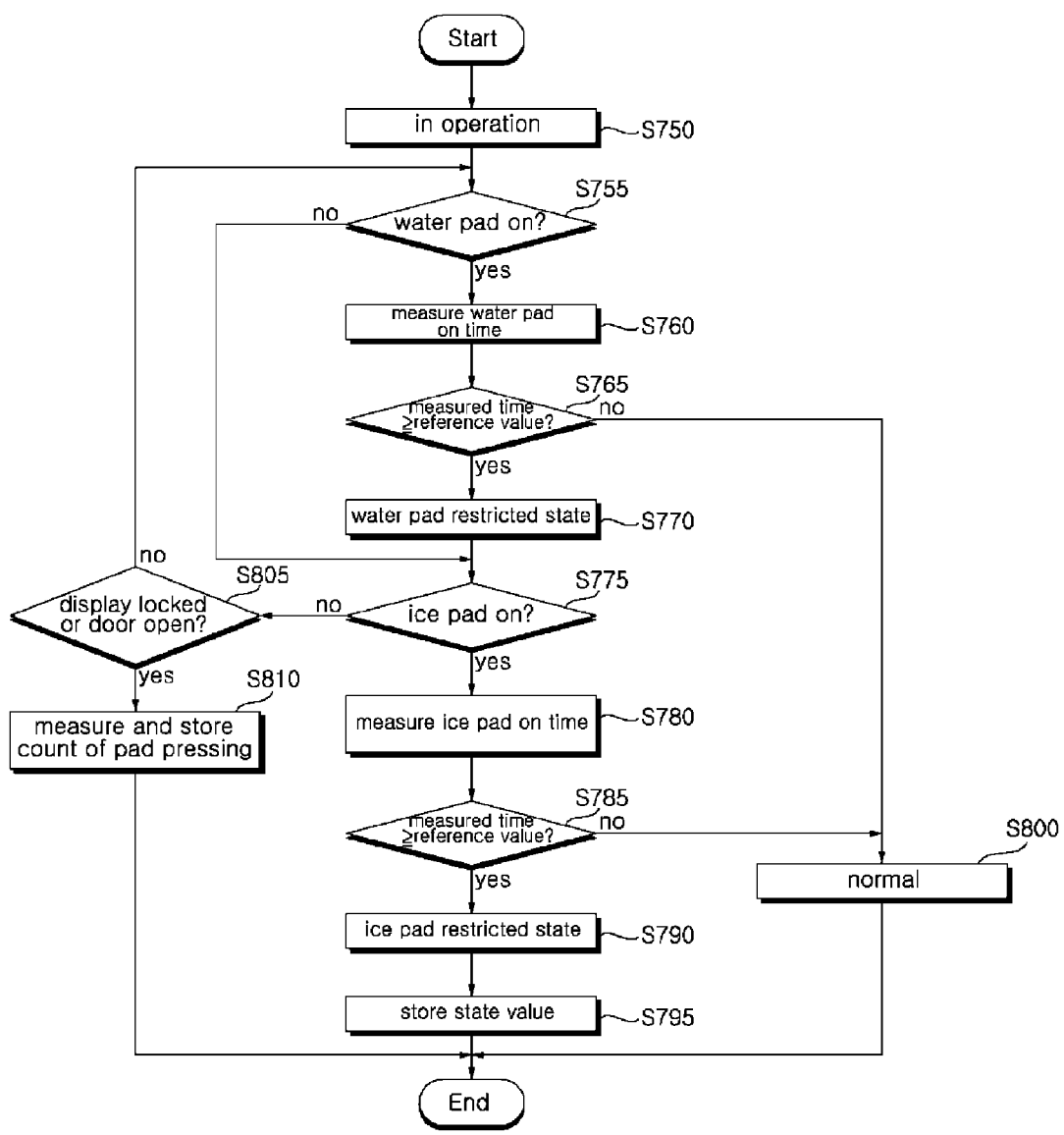
FIG. 19 is a flowchart illustrating a method of determining whether a dispenser is restricted by a refrigerator.

FIG. 19 is a flowchart illustrating a method of determining whether a dispenser is restricted by a refrigerator.

Referring to FIG. 19, the refrigerator 1 senses whether a dispenser from which water is taken out is restricted while the refrigerator 1 is in operation (S750).

In case the water pad is in operation (S755), i.e., when the water pad is turned on and water is taken out, the controller 160 measures a time during which the water pad maintains the ON state (S760).

At this time, if the time measured for the ON state of the water pad is not less than a reference value (S765), the controller 160 determines that the water pad is restricted and the ON state of the water pad lasts (S770). If the water pad is restricted, the water pad maintains the ON state, so that water continues to be taken out through the dispenser.

Meanwhile, in case the ice pad is in operation (S775), the controller 160 measures a time during which the water pad maintains the ON state (S780).

If the time measured for the ON state of the ice pad is not less than a reference value (S785), it is determined that the ice pad is restricted and maintains the ON state (S790). If the ice pad is restricted, the ice pad maintains the ON state and thus ice continues to be taken out. However, depending on the amount of stored ice, a state may last where ice is no more taken out after ice taking is done for a predetermined time.

The controller 160 stores a state value when sensing that, as described above, the water pad is restricted or the ice pad is restricted (S795). For example, if each of the water pad and the ice pad is in a restricted state, data 1 is stored, and if each is in a normal state, data 0 is stored.

At this time, if a time measured for the ON state of the water pad or the ice pad is less than a reference value, it is determined that it has been operated by a user for a long time (S800).

Meanwhile, if the water pad or ice pad of the dispenser is manipulated with the display locked or with the door opened (S805), the controller 160 measures and stores the number of times of pad pressing (S810).

The controller 160 stores each of whether the water pad is restricted, whether the ice pad is restricted, and the number of times of pad pressing under the above conditions, includes this in the product information upon start of the smart diagnosis, and outputs as a signal sound. Accordingly, the diagnosing apparatus diagnoses the state of the refrigerator based on the data.

Figure 20:
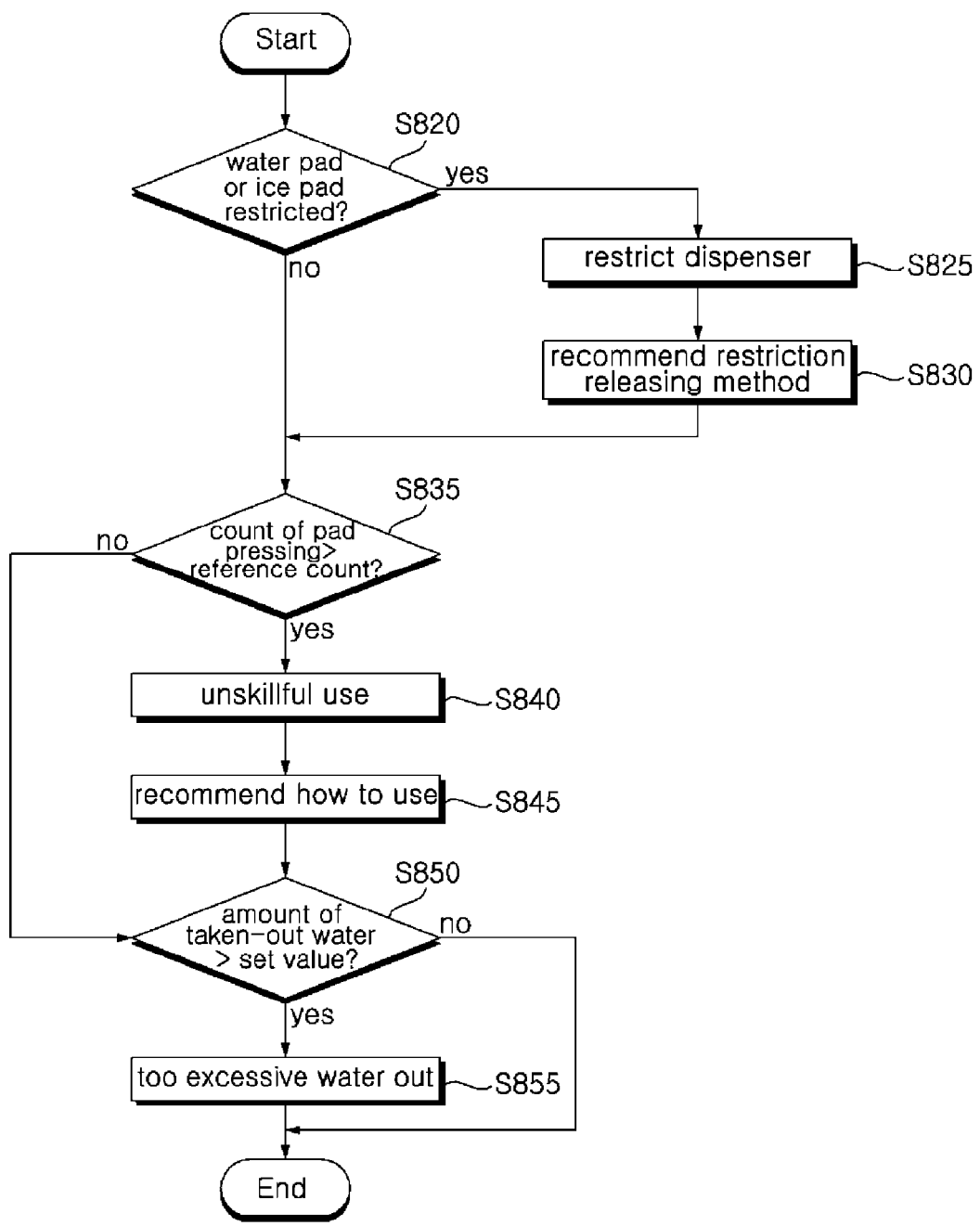
FIG. 20 is a flowchart illustrating a method of diagnosing whether a diagnosis of a refrigerator is broken.

FIG. 20 is a flowchart illustrating a method of diagnosing whether a diagnosis of a refrigerator is broken.

If the amount of taken-out water described above in connection with FIG. 18 and whether the dispenser is restricted or the number of times of pad pressing described above in connection with FIG. 20 are included in the product information and is output as a signal sound, the diagnosing apparatus of the service center receives and records the signal sound.

The diagnosing apparatus of the service center analyzes the signal sound recorded corresponding to a user's diagnosis request and converts and diagnoses the state of the refrigerator 1 based on the extracted product information.

The diagnosing unit 250 of the diagnosing apparatus first determines whether the water pad is in the restricted state or whether the ice pad is in the restricted state based on data on whether the dispenser is restricted included in the product information (S820). At this time, if a data value of each is 1, it means the restricted state, and if 0, it means the normal state.

If either the water pad or the ice pad is in the restricted state according to the data included in the product information, the diagnosing unit 250 determines as a failure diagnosis that the dispenser is in the restricted state (S825) and outputs a measure explaining how to release the restricted state of the dispenser (S830).

Further, if the number of times of pad pressing is not less than a reference value, a cause of failure under which the refrigerator is not normally operating is attributed to a user's poor manipulation (S840) and a measure is output to recommend how to use (S845).

Here, the number of times of pad pressing is the number of times calculated when the water pad or ice pad of the dispenser is pressed with the display of the refrigerator locked or with the door opened. That is, it ends up meaning that the dispenser provided at the refrigerator door is operated to take water or ice with the refrigerator door opened. Therefore, the feature of the refrigerator configured so that the dispenser is not normally operated with the refrigerator's display left in the locked state or with the door left open and how to use the refrigerator are guided.

Further, if the amount of taken-out water is not less than a set value, the diagnosing unit 250 determines that water is excessively taken out and outputs a measure thereon to guide it (S855). In particular, in case a user who requested diagnosis complains that the temperature of the cool water is too high, this is explained to come from the fact that too much water has been taken out.

As such, the diagnosing apparatus may diagnose water taking out and the state of the dispenser, so that the refrigerator may be diagnosed in view of a user's minor mistakes or failure to accustom himself to use of the refrigerator, and may output a measure thereon as a diagnosis result, thereby eliminating the user's complaint.

Figure 21:
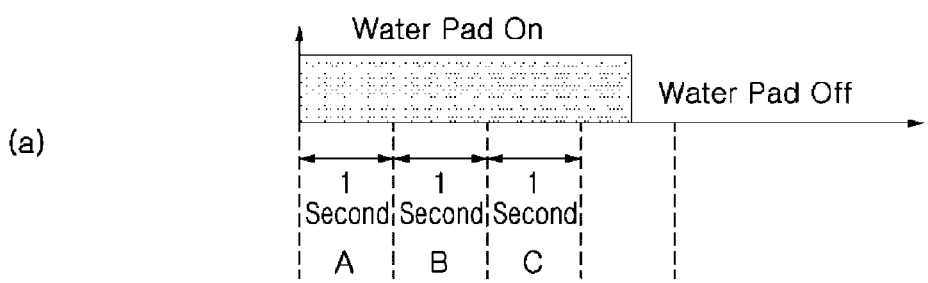
FIG. 21 shows water pressure levels of a refrigerator.
Figure 22:
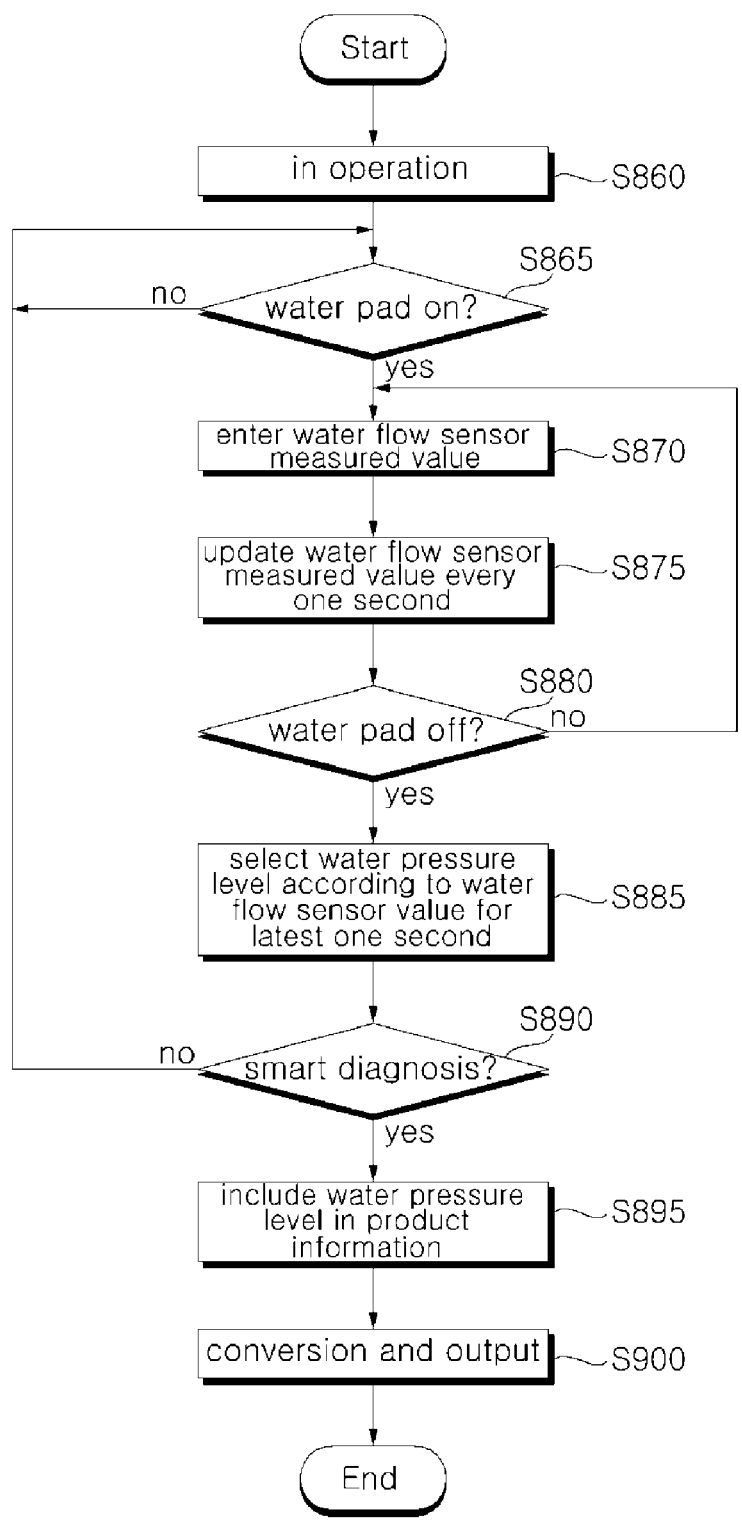
FIG. 22 is a flowchart illustrating a method of measuring a water pressure in a refrigerator.

FIG. 21 shows water pressure levels of a refrigerator, and FIG. 22 is a flowchart illustrating a method of measuring a water pressure in a refrigerator.

Referring to FIG. 21a, while the water pad is in operation (ON), the refrigerator 1 measures a water pressure according to a value measured by the water flow sensor every one second.

The controller 160 measures water pressures A, B, and C every one second while the water pad is in operation, and when a new water pressure is measured until the water pad is turned off, the existing water pressure is deleted and updated with a newly measured water pressure. Accordingly, if the water pad is turned off, water pressure C, the last measured one of the measured water pressures, is stored.

Upon entry into the smart diagnosis mode, the controller 160 sets a water pressure level of the stored water pressure according to a predetermined water pressure table and outputs the product information as a signal sound with the water pressure level included in the product information.

As shown in FIG. 21b, water pressures are separated into seven levels, each of which is classified into a lower water pressure, a normal water pressure, and a higher water pressure.

Water pressure is associated with water taking out from the 1. Thus, the refrigerator 1 assigns levels to water pressures measured and updated every one second while the water pad is in operation and includes the levels in the product information, and the diagnosing apparatus uses the water pressure information as auxiliary information for determining water taking out or whether the dispenser is restricted.

For example, when the refrigerator is diagnosed to take too little water from a failure report, the diagnosing apparatus outputs the diagnosis for the amount of taken-out water or whether the dispenser is restricted, together with the water pressure levels, so that a manager of the service center may guide that the errors are from a lower water pressure.

As shown in FIG. 22, when the refrigerator 1 is in operation (S860) and the water pad is operated (S865), water is taken out while the water flow sensor is operated as the water flows, and accordingly, a value measured by the water flow sensor is entered (S870).

The controller 160 updates and stores the value measured by the water flow sensor every one second (S875).

The controller 160 repeats measure and update of the amount of flowing water by the water flow sensor (S870 to S880) while the water pad is in operation, that is, until the water pad is turned off (S880).

If the water pad is turned off (S880), the controller 160 selects a water pressure level according to a water flow sensor value obtained for the latest one second, i.e., according to the water flow sensor value measured the last. At this time, as described above in connection with FIG. 21b, water pressure levels are classified into seven levels and are divided again into lower water pressure, normal, and higher water pressure.

While the water pad is in operation until the smart diagnosis is initiated, the water pressure according to the value measured by the water flow sensor is periodically and repeatedly updated (S865 to S890).

If the smart diagnosis is started (S890), the controller 160 generates product information including a water pressure level corresponding to the last stored water pressure (S895) and converts and outputs the product information as a signal sound (S900).

Figure 23:
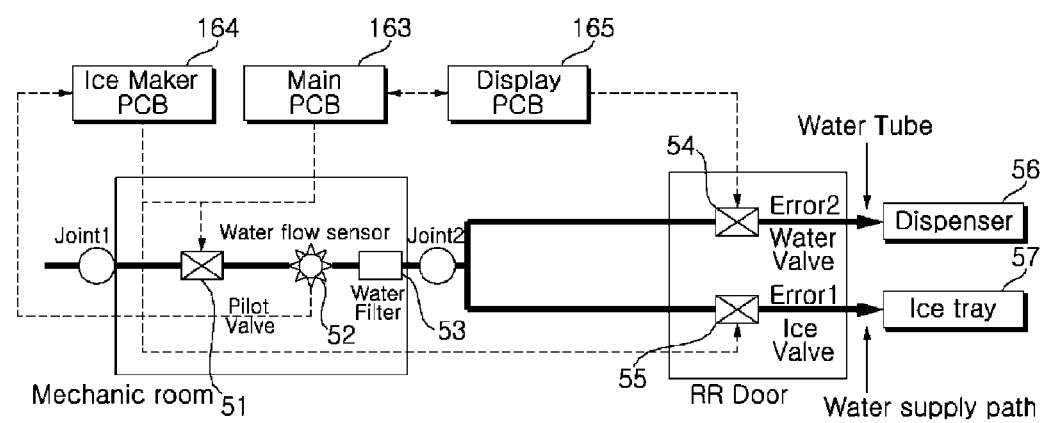
FIG. 23 is a view illustrating a dispenser configuration in a refrigerator.

FIG. 23 is a view illustrating a configuration of taking water in a refrigerator. Referring to FIG. 23, the controller 160 of the refrigerator may include a control circuit 164 for controlling the ice maker, a main control circuit 163 for performing control on the operation of the refrigerator, and a display control circuit 165 for controlling information displayed. At this time, the display control circuit 165 may correspond to the input/output controller 143 as shown in FIG. 5.

The configuration for water taking out in the refrigerator may be divided into a mechanical room including a pilot valve 51 provided in a main pipe through which water flows to control the flow of water, a water flow sensor 52 sensing the amount of water flowing through the pilot valve 51, and a water filter 53, a refrigerating compartment door unit (RR door) including an ice valve and a water valve provided in each water pipe that is split at a second point Joint 2 behind the water filter, and a dispenser and an ice tray 57.

At this time, the operation of the pilot valve and the ice valve is controlled by the control circuit 164 of the ice maker, and values measured by the water flow sensor are fed back to the ice maker control circuit 164. Further, the water valve 54 is controlled by the display control circuit 165.

When the water pad operates, the pilot valve 51 and the water valve 54 are opened so that water is taken out to the dispenser 56 and the water flow sensor 52 measures the water amount as the water flows.

Further, following the ice maker's ice making operation, ice is removed from the ice tray, and then, the pilot valve 51 and the ice valve 55 are opened so that water is supplied to the ice tray. Also at this time, even though the water flow sensor operates, the amount of water supplied to the ice tray is excluded from calculation of the amount of taken-out water.

In such water taking out structure, in case no water or ice is taken out even when the water pad or ice pad is operated, there may be an error in water supplying itself or in the valves provided, the refrigerator 1 stores the state of each valve and whether to measure the amount of flowing water and determines whether there is an error.

For example, the controller 160 determines an error in the dispenser 56 or in the water valve 54 as error 1 ERROR1 and an error in the ice valve 55 or in the ice tray 57 as error 2 ERROR2. However, a problem with the dispenser's restriction is separately determined as described above, and the ice tray may be separately determined by performing failure diagnosis on ice making.

The diagnosing apparatus diagnoses the state of the refrigerator by receiving the data.

Figure 24:
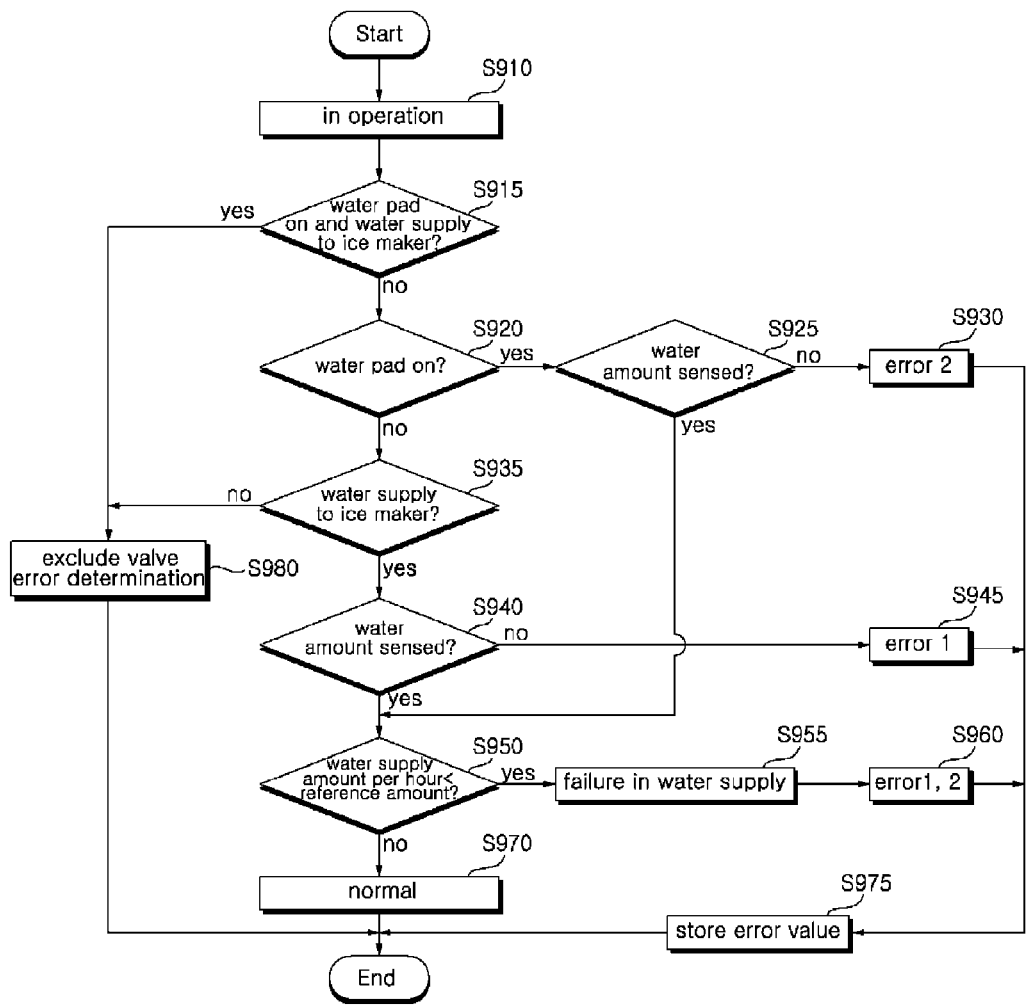
FIG. 24 is a flowchart illustrating a method of sensing a fault in water supply of a refrigerator.

FIG. 24 is a flowchart illustrating a method of sensing a fault in water supply of a refrigerator.

In case any part in the water supply structure described above is encountered with some errors, a problem with water taking out and ice taking may occur. The refrigerator 1 senses a fault associated with water supply and stores information thereof.

In sensing a water supply fault while the refrigerator is in operation (S910), the controller 160 first determines whether the water pad and the ice pad are simultaneously operated (S915). In case the water pad and the ice pad are manipulated at the same time, an error related to the valve among water supply faults cannot be determined and thus is excluded from water supply fault conditions (S980)

If the water pad of the water pad and the ice pad is operated (S920), the controller 160 determines whether the amount of flowing water is sensed according to a value measured by the water flow sensor 52.

At this time, if the amount of flowing water is not sensed while the water pad is in operation, the controller 160 records occurrence of error 2 (S930).

Further, if the ice pad of the water pad and the ice pad is operated (S935), the controller 160 determines whether the amount of flowing water is sensed according to a value measured by the water flow sensor 52 (S940).

At this time, when the amount of flowing water is not sensed, the controller 160 records error 1 (S945).

Meanwhile, in case the amount of flowing water is sensed while the water pad is in operation or in case the amount of flowing water is sensed while the ice pad is in operation, the controller 160 calculates a per-hour water supply amount with respect to the measured amount of flowing water and determines whether the per-hour water supply amount is less than a reference amount (S950).

At this time, if the per-hour water supply amount is not less than the reference amount, it is determined that water supply is in the normal state (S970).

On the other hand, if the per-hour water supply amount is less than the reference amount, the controller 160 determines there is a fault in water supply and records both error 1 and error 2 (S960). Here, as described above, the controller 160 stores water pressure measure together with water pressure level information thereon.

The refrigerator 1 sores error values for error 1 or error 2 (S975), and upon entry into the smart diagnosis mode, outputs a signal sound including each error value in the product information.

Figure 25:
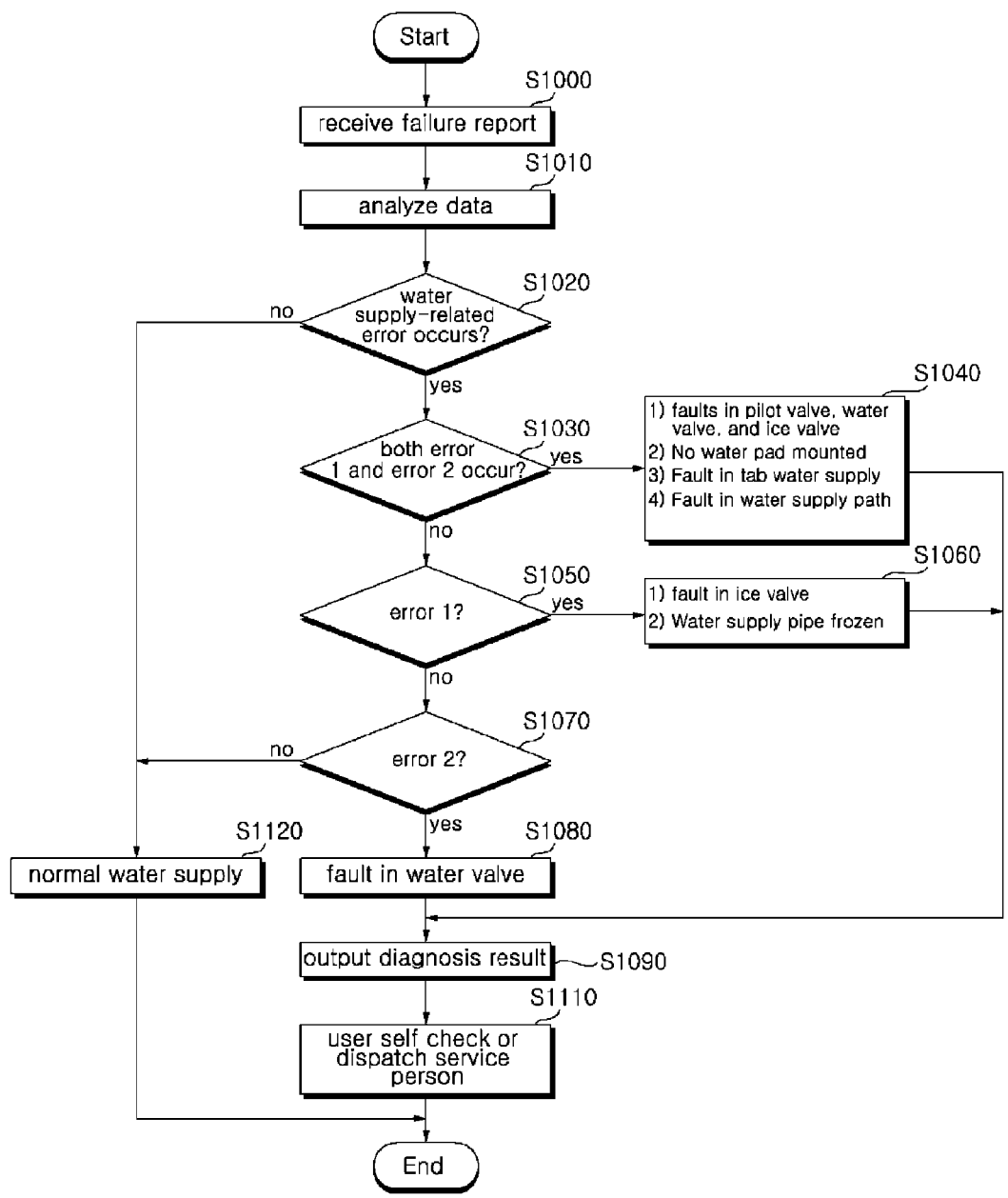
FIG. 25 is a flowchart illustrating a method of diagnosing a water supply fault in a refrigerator by a diagnosing apparatus.

FIG. 25 is a flowchart illustrating a method of diagnosing a water supply fault in a refrigerator by a diagnosing apparatus.

Referring to FIG. 25, if a failure report is received and a signal sound from the refrigerator 1 is received (S1000), the signal processing unit 240 of the diagnosing apparatus extracts product information from the signal sound, and the diagnosing unit 250 starts diagnosis on the refrigerator by analyzing data included in the product information (S1010).

The diagnosing unit 250 determines whether a water supply-related error has occurred (S1020), and in case there is no water supply-related error, determines that the water supply is left in the normal state, then diagnosing other failures (S1120).

In case a water supply-related error occurs, the diagnosing unit 250 determines whether both error 1 and error 2 have occurred (S1030), and in case errors 1 and 2 both have occurred, determines that water supply faults stem from any one of errors occurring at, at least one, of the pilot valve, the water valve, and the ice valve, errors occurring when no water filter is provided, and errors relating to tab water supply and errors in water supply paths (S1040).

Meanwhile, in case among water supply-related errors, error 1 occurs (S1050), the diagnosing unit 250 determines that water supply faults come from errors in the ice valve or freezing in the water supply pipes (S1060).

Further, in case among the water supply-related errors, error 2 occurs (S1070), the diagnosing unit 250 determines that water supply faults come from errors in the water valve (S1080).

Accordingly, the diagnosing unit 250 induces a measure responding to the water supply faults so that a user checks on his own or a service person is dispatched and outputs a diagnosis output on the displaying unit 210 (S1090).

Accordingly, the service center informs a user of what needs to be checked according to the diagnosis result output on the displaying unit 210 and proceeds with dispatch of the service person (S1110).

Figure 26:
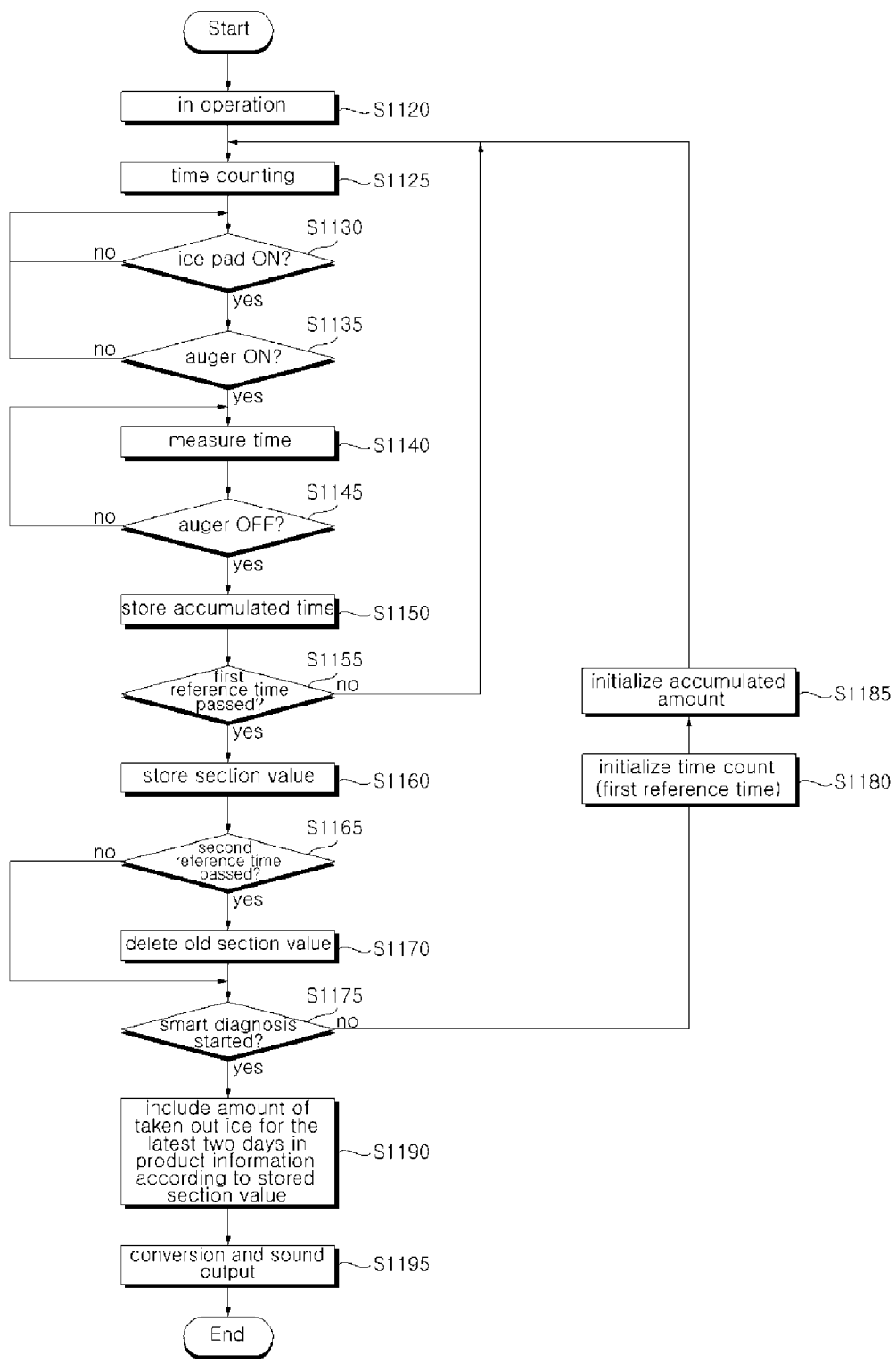
FIG. 26 is a flowchart illustrating a method of storing taken out ice amount data of a refrigerator.

FIG. 26 is a flowchart illustrating a method of storing taken out ice amount data of a refrigerator.

Referring to FIG. 26, while in operation (S1120), the refrigerator 1 periodically stores the amount of ice taken out and accordingly counts the times (S1125). With respect to the amount of ice taken out, data for 48 hours, i.e., two days is stored, with 12 hours set as one section.

If the ice pad is operated (S1130), the controller 160 determines whether an auger provided in the ice maker operates (S1135). At this time, the auger is a device for pushing ice when the ice pad is operated in the ice maker and enables ice to be taken out to the outside.

The auger is operated as a motor connected thereto operates.

If the ice pad and the auger operate, the operation time is measured until the auger stops (S1140). If the auger stops (S1145), the operation time of the auger is accumulatively stored (S1150). At this time, the operation time of the auger is measured on a per-second basis and stored.

Until the counted time reaches a first reference time (S1155), the operation time of the auger as the ice pad and the auger operate is measured and is accumulatively stored (S1125 to S1155).

If the first reference time comes along (S1155), the controller 160 stores the accumulatively stored auger operation time as a section value (S1160).

Here, the first reference time corresponds to one section and is about 12 hours. That is, the auger operation time is stored with 12 hours set as one section, and the auger operation time is when ice is taken out.

Accordingly, based on the accumulatively stored auger operation time, the amount of ice taken out may be calculated. The amount of ice taken out may vary depending on product, but the amount of ice taken out is calculated so that about 19.4 g of ice is taken out per second. At this time, the maximum amount of ice made by the ice maker for 2.5 days is about 4950 g, and upon ice removing, about 100 g of ice is removed at once, and ice removing may be done about 35 times to 50 times for 2.5 days.

After the section value is stored, it is determined whether the second reference time is passed (S1165), and in case it's less than the second reference time and the smart diagnosis is not started (S1175), the auger's operation time stored during the first reference time and the count for the first reference time are initialized (S1180 and S1185), and data for a new section is stored (S1125 to S1175).

As such, the auger's operation time for calculating the amount of ice taken out is stored for each section, and if the second reference time comes along (S1165), the oldest section value is deleted (S1170). Here, the second reference time is about 48 hours and corresponds to four sections.

In case a new section value is stored while the auger's operation time stored for four sections, the oldest section value is deleted and only the data for the latest 48 hours is maintained and stored.

Meanwhile, if smart diagnosis is initiated while the auger's operation time is stored every 12 hours as described above (S1175), product information is generated including the stored section value, i.e., values for the four sections for the latest 48 hours (S1190).

The refrigerator 1 converts the product information and outputs as a signal sound through the sound output unit 150 (S1195).

Accordingly, upon entry into a smart diagnosis mode, the refrigerator 1 outputs the signal sound including in the product information data for the auger's operation time (ice removal time) of the latest 48 hours as stored for each section with respect to the corresponding time.

The diagnosing apparatus of the service center receives the signal sound, extracts the product information, calculates the amount of ice taken out from the refrigerator by using the data for the auger's operation time (ice removal time) for the latest 48 hours included in the product information, and diagnoses the state of the refrigerator accordingly.

Figure 27:
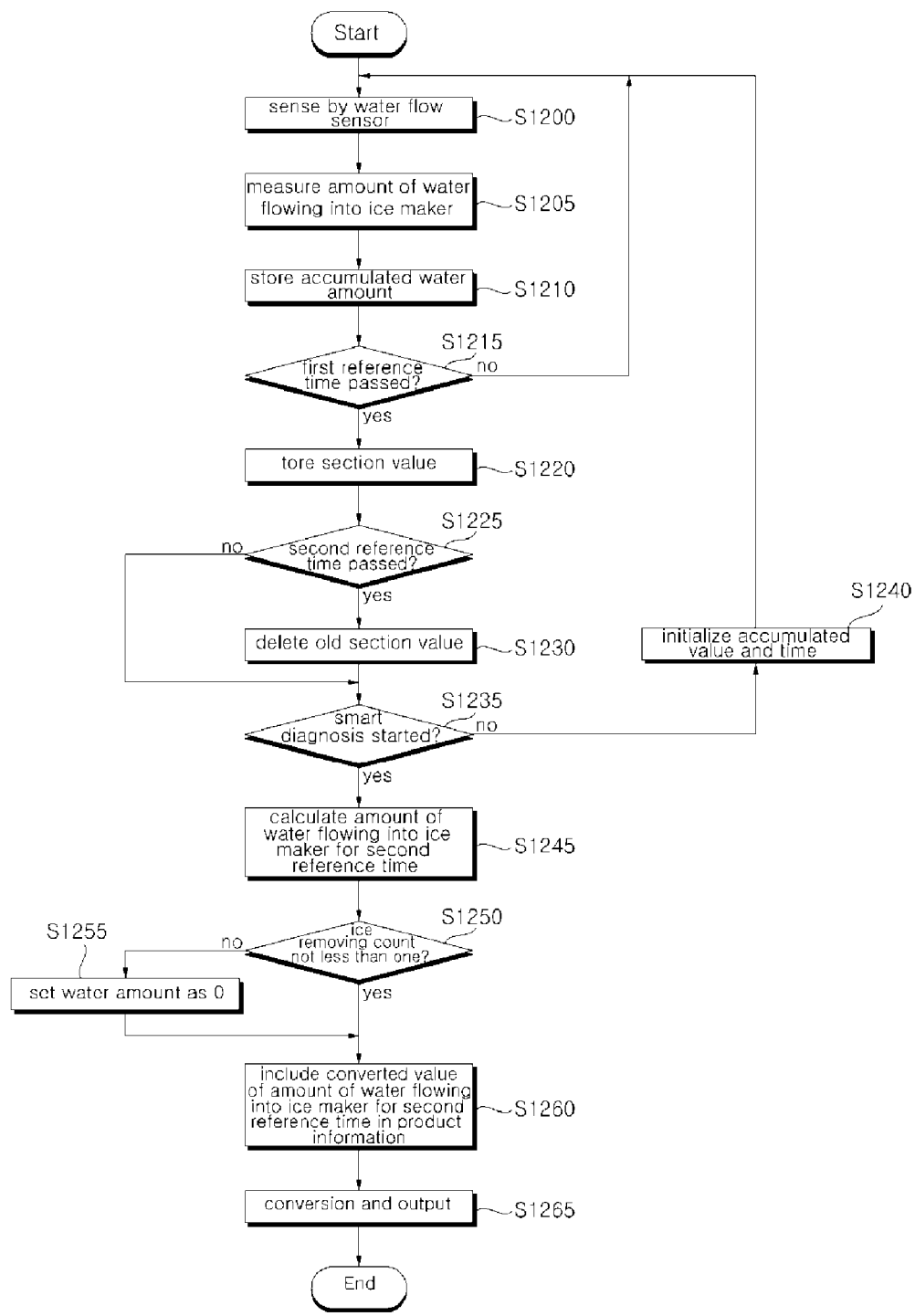
FIG. 27 is a flowchart illustrating a method of storing the amount of ice made in a refrigerator.

FIG. 27 is a flowchart illustrating a method of storing the amount of ice made in a refrigerator.

As shown in FIG. 27, in case the water pad operates so that ice is taken out or water is fed into the ice maker so that ice is made, the water flow sensor senses the amount of flowing water (S1200).

A value measured by the water flow sensor while the water pad stays non-operating is deemed the amount of water flowing into the ice maker, and the flowing water amount is measured (S1205). The flowing water amount is accumulatively stored (S1210).

An initial flowing water amount is stored, and until the first reference time comes along (S1215), the amount (pulse) of water flowing into the ice maker is measured as described above and is accumulatively stored (S1200 to S1215).

At the first reference time (S1215), the controller 160 stores the accumulatively stored amount of water flowing into the ice maker as a section value (S1220).

As described earlier, the first reference time is a value corresponding to one section and is about 12 hours. That is, the amount of water flowing into the ice maker is accumulatively stored with 12 hours set as one section, and this is stored up to 48 hours for each section.

At this time, water flowing into the ice maker turns into ice in the ice maker, and the ice is removed from the ice maker and is taken out when the ice pad is operated as described above.

Accordingly, the amount of ice made is calculated from the amount of water flowing into the ice maker.

After the section value is stored, it is determined whether the second reference time is passed (S1225). If it is less than the second reference time and the smart diagnosis is not initiated (S1235), the amount of water stored for the first reference time and the count for the first reference time are initialized (S1240), and data for a new section is stored (S1200 to S1235).

As such, if the amount of water flowing into the ice maker is measured and stored for each section for calculating the amount of ice made and the second reference time comes along (S1225), the oldest section value is deleted (S1230). Here, the second reference time is about 48 hours and corresponds to four sections.

In case a new section value is stored with the amount of water flowing into the ice maker stored for four sections, the oldest section value is deleted thereby maintaining only the data for the latest 48 hours.

Meanwhile, if the smart diagnosis is started while the auger's operation time is stored every 12 hours as described above (S1235), the stored section values, i.e., values for the four sections for the latest 48 hours are summed and converted to a predetermined unit (S1245).

For example, a pulse value of the summed water amount is converted into a unit of about 98 pulses. The 98 pulses of water amount corresponds to about 20 g of ice, and accordingly, conversion is performed on a per-98 pulses basis.

Before the converted value is generated as product information, the controller 160 determines whether the number of times of ice removal is not less than one (S1250. In case ice making in the ice maker is done but ice removal is not performed, this means that the ice has not been used, and accordingly, the amount of water flowing into the ice maker is set as 0 (S1255). That is, in such case, the amount of ice made is 0.

If the number of times of ice removal is one or more, the controller 160 generates the converted value of the amount of water flowing into the ice maker as the product information (S1265). At this time, since water pressure influences ice making, the water level is also included in the product information.

Therefore, upon entry into the smart diagnosis mode, the refrigerator 1 outputs a signal sound including in the product information the accumulated amount of water flowing into the ice maker for the latest 48 hours as stored for each section with respect to the corresponding time.

Figure 28:
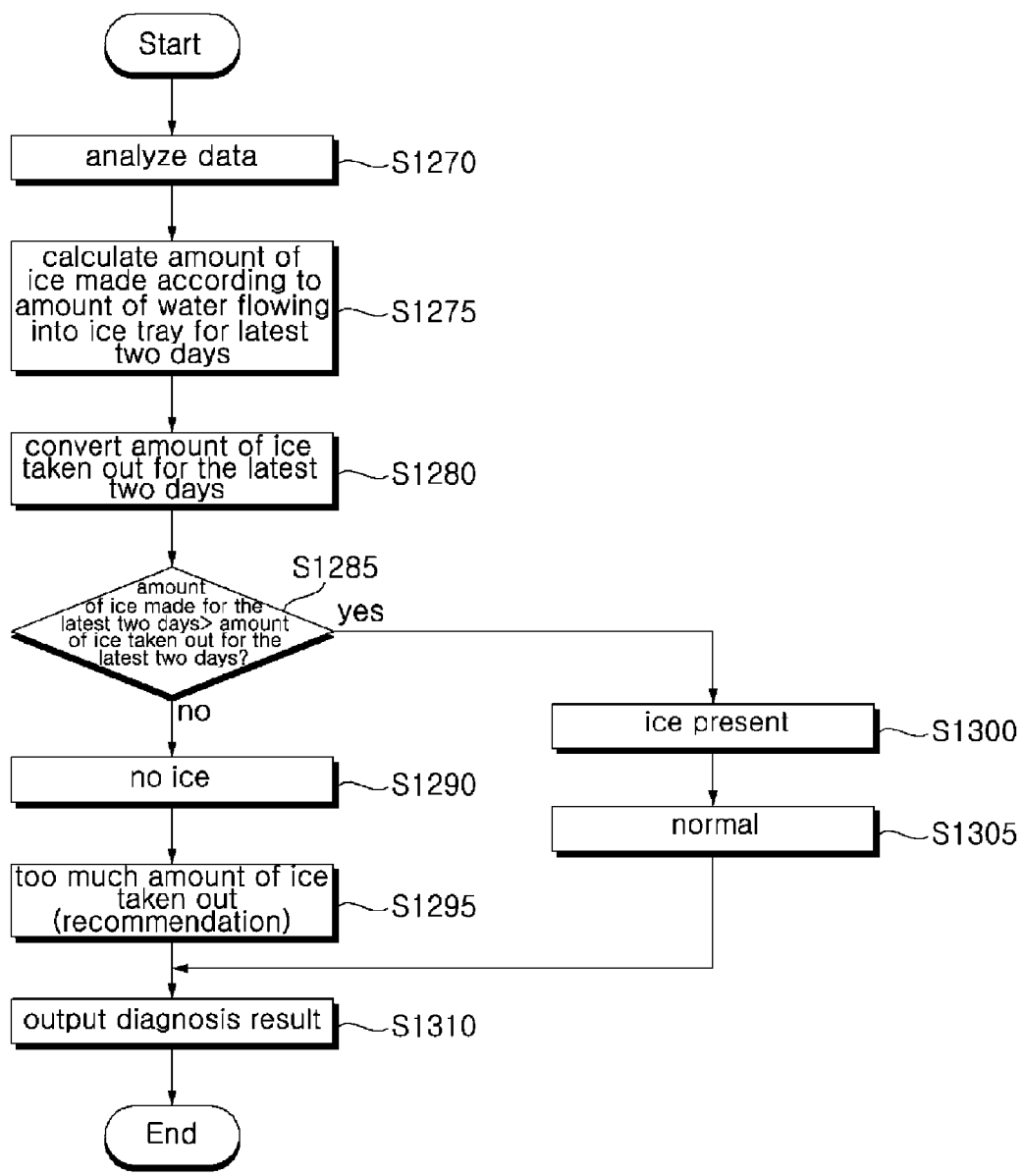
FIG. 28 is a flowchart illustrating a method of diagnosing a refrigerator according to a failure to taking ice out by a diagnosing apparatus.

FIG. 28 is a flowchart illustrating a method of diagnosing a refrigerator according to a failure to taking ice out by a diagnosing apparatus. Referring to FIG. 28, when receiving the signal sound of the refrigerator 1, the diagnosing apparatus extracts the product information from the signal sound and analyzes the data included in the product information, thereby starting diagnosis on the refrigerator.

The diagnosing unit 250 analyzes the data (S1270) and calculates the amount of ice made in the refrigerator based on the amount of water supplied into the ice tray for the latest two days, i.e., a converted value of the amount of water flowing into the ice maker (S1275).

At this time, the amount of water flowing into the ice maker is a value obtained by converting a water amount into a unit of 98 pulses. The water amount of 98 pulses corresponds to about 20 g of ice, and the amount of ice made is calculated by multiplying the converted value of the water amount included in the product information by about 20 (20.0409). That is, the amount of water flowing into the ice maker as measured on a per-pulse basis is divided by 98 and is then multiplied by 20.0409, thereby yielding the amount of ice made.

Further, the diagnosing unit 250 performs conversion to the amount of ice removed by using the auger's operation time (ice removal time) for the latest two days (S1280).

Although the amount of ice removed varies depending on product, the amount of removed ice may be calculated according to the auger's operation time assuming about 19.4 g of ice is taken out per second. At this time, the maximum amount of ice made by the ice maker for 2.5 days is about 4950 g, and when ice removal is performed once, about 100 g of ice is removed, and ice removal may be performed about 35 times to about 50 times for 2.5 days.

The diagnosing unit 250 compares the amount of ice made for the latest two days with the amount of ice taken out for the latest two days (S1285). In case the amount of ice made for the latest two days is not more than the amount of ice taken out for the latest two days, the diagnosing unit 250 determines that there is no ice (S1290) and produces a measure to inform that since too much ice is taken out and so no more ice is taken out (S1295).

On the other hand, in case the amount of ice made for the latest two days is larger than the amount of ice taken out for the latest two days, the diagnosing unit 250 determines that there is ice in the refrigerator (S1300) and that the refrigerator normally operates in light of ice removal (S1305).

The diagnosing unit 250 outputs such a diagnosis result on the displaying unit 210 (S1310).

Figure 29:
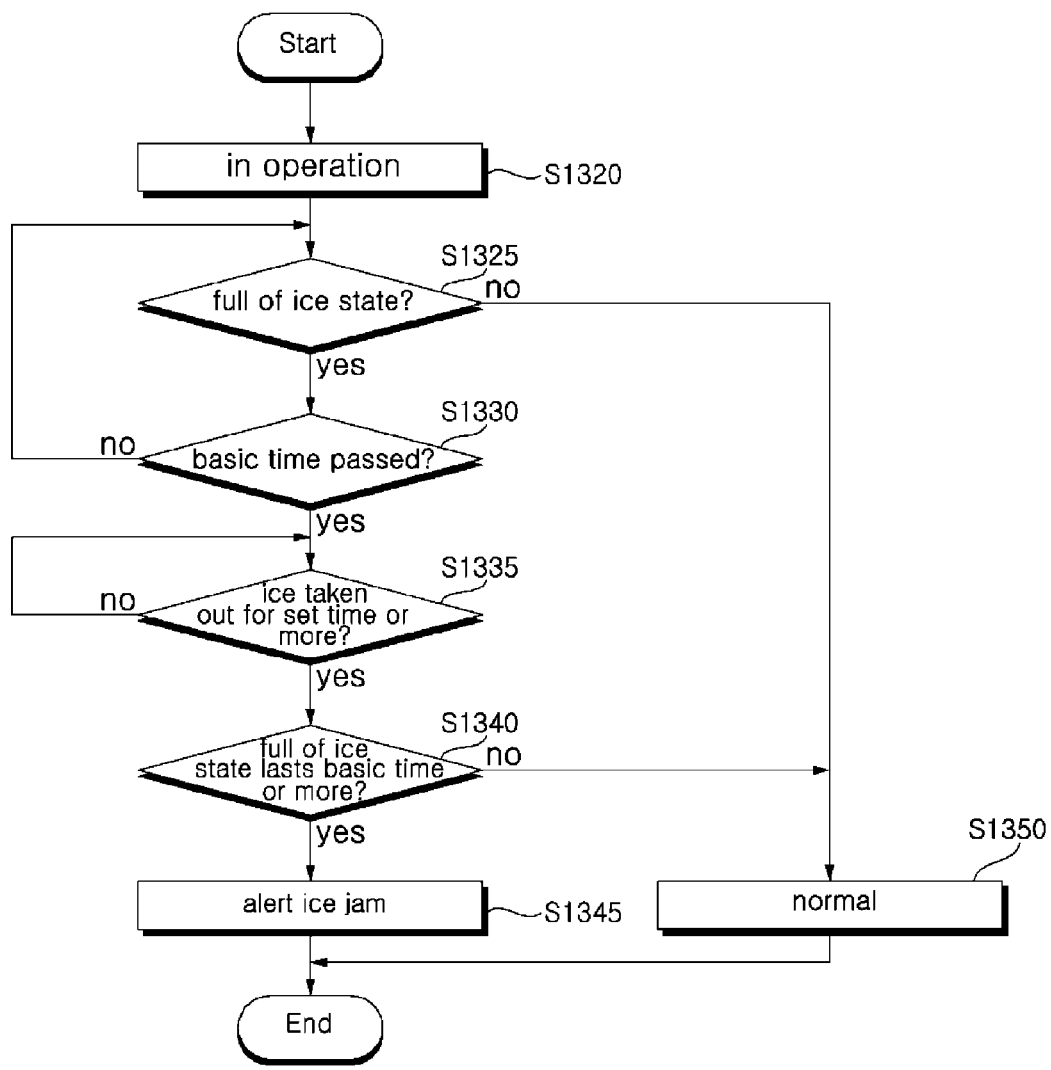
FIG. 29 is a flowchart illustrating a method of determining an ice jam in a refrigerator.

FIG. 29 is a flowchart illustrating a method of determining an ice jam in a refrigerator. Referring to FIG. 29, while in operation (S1320), the refrigerator 1 determines whether the ice maker is in a full-of-ice state (S1325).

The controller 160 determines whether the full-of-ice state lasts a basic time or more (S1330).

At this time, in case the ice maker is in the full-of-ice state and the full-of-ice state lasts the basic time or more, the controller 160 recognizes the full-of-ice state and senses whether the ice pad operates and ice is taken out (S1335).

If ice is taken out a predetermined time or more, the full-of-ice state is sensed again and it is determined whether the full-of-ice state is maintained the basic time or more (S1340).

If the full-of-ice state lasts the basic time or more even after a predetermined amount of ice has been taken out while the full-of-ice state is maintained for the basic time or more, the controller 160 outputs an ice jam alert and stores it (S1345).

Meanwhile, if after ice being taken out, the full-of-ice state is released, it is determined that ice is normally being taken out from the ice maker (S1350).

If the full-of-ice state lasts for a predetermined time as described above, the controller 160 stores the ice jam alert and upon smart diagnosis generates as product information and outputs as a signal sound.

Accordingly, in case an ice jam alert is set in the product information, when there is a problem with ice removal, for example when a failure report is received such as when ice is not taken out even through there is ice and normal operation is on as described above, the diagnosing apparatus may check if ice is jammed and may perform diagnosis on the problem with ice removal.

Therefore, the refrigerator may store data for ice making and ice removal and may output the product information as a signal sound, and the diagnosing apparatus may perform diagnosis on the state of the refrigerator in view of ice making and ice removing based on the data included in the product information, thereby producing a measure thereto. Thus, diagnosis on the refrigerator may be easily done, and failures in the refrigerator may be responded.

Figure 30:
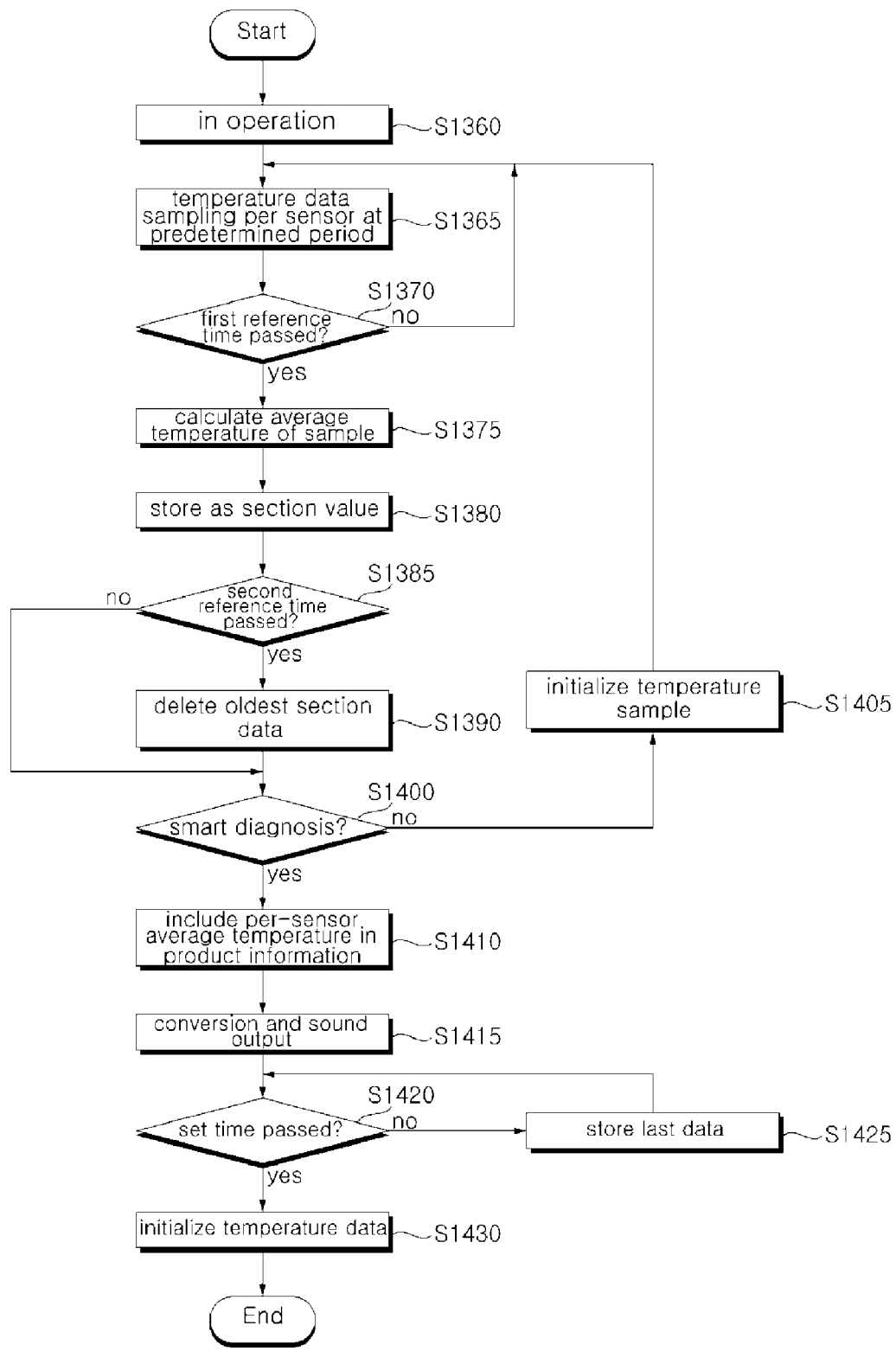
FIG. 30 is a flowchart illustrating a method of storing temperature data in a refrigerator as shown in FIG. 14.

FIG. 30 is a flowchart illustrating a method of storing temperature data in a refrigerator as shown in FIG. 14. The refrigerator 1 stores temperature data measured by a plurality of temperature sensors such as the refrigerating compartment temperature sensor 191, the freezing compartment temperature sensor 192, the ice tray temperature sensor 198, and the ice maker path temperature sensor 197 provided in the refrigerator and temperature data measured by the external air temperature sensor, includes the temperature data in the product information upon smart diagnosis and outputs as a signal sound.

At this time, the refrigerator 1 stores and maintains data for about 48 hours every 12 hours with respect to the temperature data, with 12 hours set as one section.

Referring to FIG. 30, while the refrigerator 1 is in operation (S1360), temperature is periodically measured by the plurality of temperature sensors provided in and outside the refrigerator and temperature data is entered from each sensor (S1365).

The controller 160 stores a temperature data sample for 12 hours which is the first reference time for each temperature sensor, and after the first reference time elapses (S1370), calculates an average temperature on the temperature data sample (S1375), then stores the calculated average temperature as a section value (S1380).

If temperature data is measured and entered by each temperature sensor at a predetermined time interval, the controller 160 of the refrigerator 1 calculates an average temperature for the entered temperature data. At this time, the controller 160 calculates an average temperature for one section.

That is, an average temperature is calculated on the temperature data entered at a predetermined time interval for the first reference time, 12 hours, and the calculated average value is then stored as the section value. When temperature data is entered every about 3 minutes, 240 pieces of temperature data are entered for one section.

After the section value is stored, the entered temperature data sample is deleted.

In case time does not reach the second reference time (S1385) or in case smart diagnosis is not initiated (S1400), the temperature sample is initialized (S1405), and the process of storing the average temperature of the temperature data samples as the section value is repeatedly performed every 12 hours which is the first reference time (S1365 to S1405).

Meanwhile, in case the second reference time is passed, the oldest section data is deleted (S1390). However, as described above in connection with FIG. 14, the oldest first section data is deleted when the section value is stored for the fifth section data, and the first section data is maintained until the section value for the fifth section is stored.

That is, calculation of the average temperature of the temperature data is performed for four sections, 48 hours, and the data for the sections which have passed 48 hours or more is deleted, while a section value for new data is stored.

As described above in connection with FIG. 14, average temperature m1 for temperature data measured for 12 hours in first section A is calculated and is stored as a section value for the first section A. If the section value for the first section is stored, the whole temperature data for the first section is deleted, and temperature data for second section B is newly processed. Average temperature m2 is calculated based on the temperature data for the second section B and is stored as a section value, while the entire temperature data is deleted.

In such a way, average temperature m4 for fourth section D is stored, and temperature data for a new fifth section E is processed.

At this time, the data for the first section A is maintained until the section value for the fifth section is calculated, and the data for the first section A, which is data obtained 48 hours before the average temperature for the fifth section is stored is deleted.

As such, if smart diagnosis is initiated while an average temperature of temperature data is stored as a section value (S1400), the controller 160 counts the number of samples of temperature data and temperature sum for the above-described fifth section, a new section until the smart diagnosis is started.

The controller 160 calculates the average temperature for the latest two days for each temperature sensor by dividing the temperature sum for the fifth section and the average temperature for each section by the total number of samples and includes it in the product information (S1410).

At this time, if smart diagnosis begins before the section value for the fifth section is calculated, the controller calculates temperature sum T for temperature data until the smart diagnosis is started for the fifth section and counts the number n of pieces of temperature data for the fifth section.

The controller 160 calculates an average temperature for the section values for the fifth to fourth sections and the temperature sum for the fifth section and includes it in the product information as the average temperature for the latest two days per temperature sensor.

Here, the average temperature for the latest two days is calculated by adding a sum of section values m1 to m4 for first to fourth sections to temperature sum T for the fifth section and then dividing it by the total number of samples for the first to fifth sections.

The average temperature for each section is an average value based on 240 pieces of temperature data, and temperature sum T for the fifth section is a temperature sum for n pieces of temperature data. Accordingly, the average temperature for the latest two days is a value obtained by dividing a sum of m1 to m4 and T by 960+n.

The product information undergoes a predetermined conversion process and is output as a signal sound through the sound output unit 150 (S1415).

At this time, the controller 160 maintains the data for the average temperature for the latest two days (S1425) for a predetermined time without deleting data after the signal sound is output (S420). This is to maintain the last data for a predetermined time since the output signal sound may be encountered with some errors while being transferred.

If the predetermined time elapses, the data is initialized (S1430), and an average temperature for new temperature data is calculated and stored.

Figure 31:
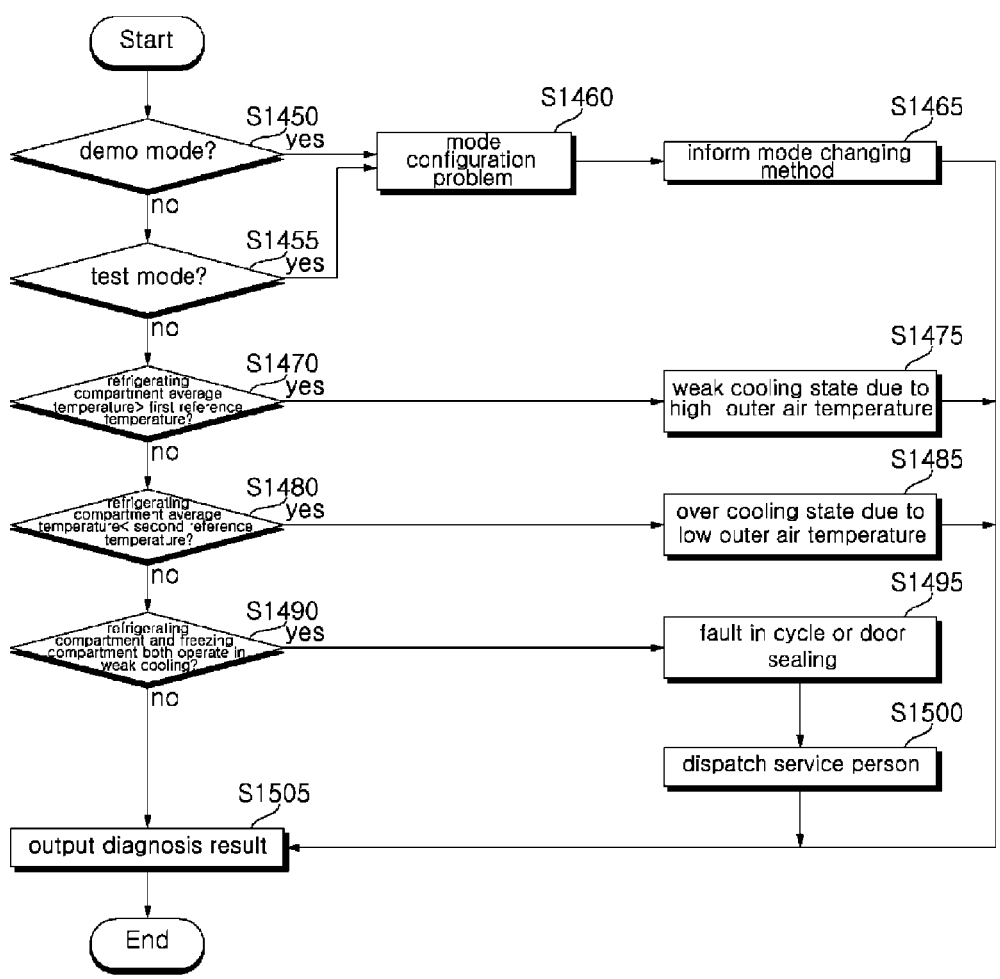
FIG. 31 is a flowchart illustrating a method of diagnosing a refrigerator according to temperature by a diagnosing apparatus.

FIG. 31 is a flowchart illustrating a method of diagnosing a refrigerator according to temperature by a diagnosing apparatus.

Referring to FIG. 31, the diagnosing apparatus extracts the product information from the received signal sound and diagnoses the state of the refrigerator.

The diagnosing unit 250 diagnoses the refrigerator based on a plurality of pieces of data included in the product information and determines whether a demo mode or test mode is set in the refrigerator according to a mode set value (S1450 and S1455).

In case the demo mode or test mode is set in the refrigerator, the diagnosing unit 250 diagnoses the refrigerator with refrigerator mode setting problems (S1460) and produces a measure to provide a mode changing method (S1465).

In case the refrigerator operates in a normal mode, the diagnosing unit 250 compares a refrigerator temperature with a refrigerating compartment average temperature and a freezing compartment average temperature of the product information to thereby determine whether the refrigerator performs weak/overcooling.

The refrigerating compartment average temperature is compared with the first reference temperature (S1470). In case the refrigerating compartment average temperature is higher than the first reference temperature, the diagnosing unit 250 diagnoses the refrigerator as being in a relatively weakly cooled state due to a higher outer air temperature (S1475). At this time, the refrigerating compartment average temperature is an average temperature in the refrigerating compartment for the latest two days.

Further, the diagnosing unit 250 compares the refrigerating compartment average temperature with a second reference temperature (S1480). In case the refrigerating compartment average temperature is lower than the second reference temperature, the home appliance diagnosing system 20 diagnoses the refrigerator as being in the overcooled state due to a lower outer air temperature (S1485).

Meanwhile, the freezing compartment average temperature is compared with predetermined third and fourth reference temperatures. The diagnosing unit 250 diagnoses the refrigerator as being in a relatively weakly cooled state due to a higher outer air temperature or being in a relatively over cooled state due to a lower outer air temperature.

At this time, the diagnosing unit 250 compares the temperature of outer air with a predetermined temperature range. In case the outer air temperature departs from the temperature range, the diagnosing unit 250 diagnoses the refrigerator as weak cooling or over cooling due to the outer air as described above.

Meanwhile, in case the product information sets the refrigerating compartment and the freezing compartment to be left in a weak cooling state (S1490), the diagnosing unit 250 diagnoses the refrigerator 1 as a failure in cycle or door sealing (S1495). In such case, a measure is produced to dispatch a service person (S1500).

The diagnosing unit 250 outputs a diagnosis result as described above on the diagnosing unit 250 (S1505).

Accordingly, the service center may explain the diagnosis result to a user and may inform what is needed to the user, as well as may dispatch a service person to the user's home to fix the refrigerator.

It may be understood by one of ordinary skill in the art that many other modifications and variations may be made to the present invention without departing from the essential features of the invention. Accordingly, the embodiments described thus far should be construed as being exemplary but not as limiting. The scope of the invention is defined by the claims rather than the detailed description above, and it should be also interpreted that all the modifications and variations induced from the meaning and scope of the claims and the equivalents thereof are also within the scope of the invention.

The invention claimed is:

1. A refrigerator comprising:
   a memory configured to store program instructions and various information that are generated according to an operation state of the refrigerator;
   a compressor configured to compress a coolant;
   a plurality of temperature sensors configured to sense a temperature of a refrigerating compartment, a freezing compartment, or external air;
   a door switch configured to operate when the door is opened or closed;
   a selecting unit having at least one button configured to receive a diagnosis execution command;
   a controller to execute the program instructions, the program instructions when executed configured to: accumulatively store the various information generated according to the operation state of the refrigerator in the memory for a predetermined time period and when the diagnosis execution command is entered through the selecting unit to generate operation information based on the information stored in the memory; and
   a sound output unit configured to output a signal sound according to product information including the operation information,
   wherein the controller updates the information stored in the memory at a predetermined period, updates the memory by deleting information of an oldest section among the accumulated information stored in the memory for the predetermined period when a set time is passed after power is on, and when the diagnosis execution command is entered through the selecting unit before the memory is first updated, generates operation information based on the information stored in the memory until before diagnosis is performed after the power is on, and
   wherein the set time is times of the predetermined period and is set a maximum time being the time it takes to store data in the memory.

2. The refrigerator of claim 1, wherein the controller senses whether a door is opened according to a signal applied from the door switch, and
   wherein the memory stores the accumulated number of times of opening of a refrigerating compartment door or a freezing compartment door during the predetermined period, and wherein the controller generates operation information including the accumulated number of times of opening of the refrigerating compartment door or the freezing compartment door stored in the memory.

3. The refrigerator of claim 1, wherein the controller senses whether a door is opened according to a signal applied from the door switch, and
   wherein the memory stores an accumulated time of opening of a refrigerating compartment door or a freezing compartment door during the predetermined period, and wherein the controller generates operation information including the accumulated time of opening of the refrigerating compartment door or the freezing compartment door stored in the memory.

4. The refrigerator of claim 1, wherein the memory stores an accumulated time of operation of a compressor during the predetermined time period, and wherein the controller generates operation information including the accumulated time of the compressor stored in the memory.

5. The refrigerator of claim 1, wherein the controller calculates per-period average values for temperature values sensed by the temperature sensor and stores the per-period average values in the memory, calculates an average temperature value for the entire predetermined time period based on the per-period average values stored in the memory, and generates operation information including the average temperature value.

6. The refrigerator of claim 5, wherein the per-period average values stored in the memory is updated whenever each period is passed, wherein the memory further stores temperature values sensed by the temperature sensor until the diagnosis is performed after the latest memory update before the diagnosis is performed, and wherein the controller calculates the average temperature value for the entire predetermined time period based on temperature values sensed by the temperature sensor until the diagnosis is performed after the latest memory update before the diagnosis is performed and the per-period average values stored in the memory and generates operation information including the average temperature value.

7. The refrigerator of claim 1, wherein the controller calculates per-period maximum values for temperature values sensed by the temperature sensor and stores the per-period maximum values in the memory, calculates a maximum value of the temperature values sensed by the temperature sensor for the predetermined time period based on the per-period maximum values stored in the memory, and generates operation information including the maximum value.

8. The refrigerator of claim 7, wherein the memory further stores temperature values sensed by the temperature sensor until the diagnosis is performed after the latest memory update before the diagnosis is performed, and wherein the controller calculates the maximum value of the temperature values sensed by the temperature sensor until the diagnosis is performed after the latest memory update before the diagnosis is performed and the per-period maximum temperature values stored in the memory and generates operation information including the maximum value.

9. The refrigerator of claim 1, wherein the controller calculates per-period minimum values for temperature values sensed by the temperature sensor and stores the per-period minimum values in the memory, calculates a minimum value of the temperature values sensed by the temperature sensor for the predetermined time period based on the per-period minimum values stored in the memory, and generates operation information including the minimum value.

10. The refrigerator of claim 9, wherein the temperature values stored in the memory are updated whenever each period is passed, wherein the memory further stores temperature values sensed by the temperature sensor until the diagnosis is performed after the latest memory update before the diagnosis is performed, and wherein the controller calculates the minimum value of the temperature values sensed by the temperature sensor until the diagnosis is performed after the latest memory update before the diagnosis is performed and the per-period minimum temperature values stored in the memory and generates operation information including the minimum value.

11. A refrigerator comprising:
a memory configured to store program instructions and various information that are generated according to an operation state of the refrigerator;
a compressor configured to compress a coolant;
a selecting unit having at least one button, configured to receive a diagnosis execution command;
a controller to execute the program instructions, the program instructions when executed configured to: accumulatively store the various information generated according to the operation state of the refrigerator in the memory for a predetermined time period and when the diagnosis execution command is entered through the selecting unit to generate operation information based on the information stored in the memory; and
a sound output unit configured to output a signal sound according to product information including the operation information,
wherein the controller deletes the information stored in the memory when a predetermined reset set time is passed after the diagnosis execution command is entered through the selecting unit and the signal sound is output through the sound output unit and performs control so that the sound output unit outputs the signal sound according to product information including operation information generated when previous diagnosis is performed when the diagnosis execution command is re-entered through the selecting unit before the reset set period is passed after the diagnosis execution command is entered through the selecting unit and the signal sound is output through the sound output unit, and
wherein the controller generates the operation information including an operation time of the compressor and a defrosting operation period.

12. The refrigerator of claim 11, wherein the controller calculates a latest defrosting operation period after the diagnosis is performed.

13. The refrigerator of claim 11, wherein the controller stores a start time of a second defrosting operation recently performed after the diagnosis is performed and an end time of a first defrosting operation recently performed after the second defrosting operation in the memory, and
wherein the controller calculates the defrosting operation period from a difference between the start time of the second defrosting operation and the end time of the first defrosting operation stored in the memory.

14. The refrigerator of claim 13, wherein the second defrosting operation is performed when the compressor continuously operates a predetermined time or more after the first defrosting operation, and
wherein the controller stores the operation time of the compressor recently operated after the second defrosting operation in the memory.

15. The refrigerator of claim 11, further comprising:
a dispenser configured to take out water when a water pad operates;
an ice maker configured to generate ice;
an auger configured to move ice in the ice maker to take the ice out to an outside when an ice pad operates; and
a water flow sensor configured to measure the amount of water flowing into the dispenser or the ice maker,
wherein the controller stores as the operation information at least one of the amount of water taken out by the dispenser according to information of the water flow sensor, restriction information of the water pad or the ice pad, water supply error information, the number of times of pad pressing, an operation time of the auger, the amount of water flowing into the ice maker, and an ice jam alert.

16. The refrigerator of claim 15, wherein the controller receives and stores the amount of flowing water measured by the water flow sensor sensing the amount of water taken out when the water pad operates, if the water amount reaches a reference value, increases an accumulated water supply amount, stores the accumulated water amount and the accumulated water supply amount for each section when a predetermined time comes along, initializes data for the water amount and the accumulated water supply amount, stores data for a new section, and when the diagnosis execution command is entered, stores an accumulated value of the accumulated water supply amount as the amount of water taken out, with the accumulated value included in the product information.

* * * * *